(12) United States Patent  
Kimura

(10) Patent No.: US 6,950,383 B2  
(45) Date of Patent: Sep. 27, 2005

(54) OBJECTIVE LENS, LIGHT CONVERGING OPTICAL SYSTEM, OPTICAL PICKUP APPARATUS, AND RECORDING AND/OR REPRODUCING APPARATUS

(75) Inventor: Tohru Kimura, Hachioji (JP)

(73) Assignee: Konica Corporation, Tokyo (JP)

( * ) Notice: Subject to any disclaimer, the term of this patent is extended or adjusted under 35 U.S.C. 154(b) by 517 days.

(21) Appl. No.: 10/136,355

(22) Filed: May 2, 2002

(65) Prior Publication Data

US 2003/0103437 A1 Jun. 5, 2003

(30) Foreign Application Priority Data

May 9, 2001 (JP) ........................................ 2001-138665

(51) Int. Cl.$^7$ ................................................ G11B 7/00
(52) U.S. Cl. ............................ 369/112.02; 369/112.23
(58) Field of Search ........................ 369/112.1, 112.23, 369/112.2, 44.23, 44.24, 112.01, 112.02, 112.08

(56) References Cited

U.S. PATENT DOCUMENTS 6,411,442 B1 * 6/2002 Ota et al. .................... 359/642

\* cited by examiner

*Primary Examiner*—Nabil Hindi  
(74) *Attorney, Agent, or Firm*—Finnegan, Henderson, Farabow, Garrett & Dunner, L.L.P.

(57) ABSTRACT

An objective lens for recording and/or reproducing information of an optical information recording medium, is a single lens having an aspherical surface on at least one surface. The objective lens is a finite conjugate type to converge a divergent light flux from a light source onto an information recording plane of the optical information recording medium and satisfies the following formula:

$$NA \geq 0.7$$

where NA is an image-side numerical aperture necessary for conducting recording and/or reproducing information of the optical information recording medium.

39 Claims, 23 Drawing Sheets

EXAMPLE 1

EXAMPLE 2

EXAMPLE 2

EXAMPLE 3

EXAMPLE 4

EXAMPLE 4

EXAMPLE 5

EXAMPLE 5

EXAMPLE 6

EXAMPLE 6

SPHERICAL ABERRATION (mm)

EXAMPLE 7

EXAMPLE 7

EXAMPLE 8

EXAMPLE 8

EXAMPLE 9

OBJECTIVE LENS, LIGHT CONVERGING OPTICAL SYSTEM, OPTICAL PICKUP APPARATUS, AND RECORDING AND/OR REPRODUCING APPARATUS

BACKGROUND OF THE INVENTION

The present invention relates to an objective lens for recording and/or reproducing of the information of an optical information recording medium, light converging optical system, optical pickup apparatus, and recording and/or reproducing apparatus.

The study and development of a new optical pickup system in which a blue violet semiconductor laser having an oscillation wavelength about 400 nm which is recently put into practical use is used for a light source, is advanced. In this new optical pickup system, when an objective lens whose numerical aperture is increased to about 0.85, is mounted, the recording or reproducing of the higher density information than a CD or DVD is attained. When a specific numerical value is listed, while a recording capacity of the DVD using the objective lens of the numerical aperture 0.60 and a semiconductor laser light source of the oscillation wavelength 650 nm is 4.7 Gbyte/side, when the objective lens of the numerical aperture 0.85 and the blue violet semiconductor laser light source of the oscillation wavelength 400 nm are used, it becomes 25 Gbyte/side.

In the objective lens having a high numerical aperture (particularly, more than NA 0.70), because an inclination angle of a marginal ray of light emitted from the surface of the most information recording surface side is more than 45°, the working distance is apt to decrease as compared to the objective lens having a comparative lower numerical aperture mounted onto the conventional optical pickup apparatus. Accordingly, in the optical pickup apparatus on which an objective lens having a small diameter and high numerical aperture is mounted, there is a problem in which a probability in which the objective lens is brought into contact with the optical information recording medium is large depending on a warp of the optical information recording medium.

In this connection, when a decrease of the wavelength of the laser light source or an increase of the numerical aperture of the objective lens is intended, in the optical pickup apparatus composed of a combination of the comparatively long wavelength laser light source and low numerical aperture objective lens, like as the recording or reproducing of the information is conducted on the conventional optical disk such as the CD or DVD, even when it is an almost negligible problem, it is presumed that the problem becomes prominent.

One of the problems is a problem of an longitudinal chromatic aberration generated in the objective lens due to the variation of a minute oscillation wavelength of the laser light source. In the optical pickup apparatus, because the wavelength of the luminous flux emitted from the semiconductor laser used as the light source is generally monochrome, although it is considered that the longitudinal chromatic aberration is not generated in the objective lens, there is a case where a mode hop phenomenon in which the wavelength instantly changes by several nm due to the change of the output, is generated. When the longitudinal chromatic aberration of the objective lens is not corrected, there is a possibility that the light conversing position is changed by the mode hop phenomenon and an error is generated in the recording and/or reproducing of the information. As the wavelength of the light source is reduced, because the changing amount of the light converging position is increased, as the light source of the optical pickup apparatus, when the short wavelength semiconductor laser not larger than the oscillation wavelength 600 nm, particularly the blue violet semiconductor laser of about the oscillation wavelength 400 nm is used, the correction of the longitudinal chromatic aberration generated in the objective lens is necessary.

Further, another problem actualized in the decrease of the wavelength of the laser light source and the increase of the numerical aperture is a variation of the spherical aberration generated in the objective lens by the minute oscillation wavelength variation of the light source. In the optical pickup apparatus, the semiconductor laser used as the light source has a fluctuation between individuals of an about ±10 nm in the oscillation wavelength. When the semiconductor laser having the oscillation wavelength dislocated from the reference wavelength is used for the light source, because the spherical aberration generated in the objective lens is increased as the numerical aperture is increased, the semiconductor laser having the oscillation wavelength dislocated from the reference wavelength can not be used, and the selection of the semiconductor laser used as the light source is necessary.

Further, yet another problem which is actualized in the decrease of the wavelength of the laser light source and the increase of the numerical aperture of the objective lens, is a variation of the spherical aberration of the optical system due to an error of the thickness of the protective layer (called also a [transparent substrate]) of the optical disk. Because the spherical aberration generated due to the La thickness error of the protective layer is generated in proportion to 4-th power of the numerical aperture of the objective lens, as the numerical aperture of the objective lens increases, the influence of the thickness error of the protective layer is increased, thereby, there is a probability that a stable recording or reproducing of the information can not be conducted.

SUMMARY OF THE INVENTION

An object of the present invention is to provide an objective lens for recording and/or reproducing of the information of the optical information recording medium which has a small diameter and a large working distance even when it is a high NA objective lens.

Further, even when it is a high NA objective lens, the object of the present invention is to provide an objective lens for recording and/or reproducing of the information of the optical information recording medium which has a small diameter and a large working distance, and in which the longitudinal chromatic aberration which becomes a problem when the short wavelength light source is used, is corrected.

Further, the object of the present invention is to provide a light converging optical system for recording and/or reproducing of the information of the optical information recording medium, and by which a variation of the spherical aberration generated in each optical surface of the light conversing optical system due to the oscillation wavelength variation of the laser light source, temperature humidity change, or the thickness error of the protective layer of the optical information recording medium can be effectively corrected by a simple structure.

Further, the object of the present invention is to provide a light converging optical system in which the longitudinal chromatic aberration which is a problem when the short wavelength light source is used, is corrected.

Further, the object of the present invention is to provide an optical pickup apparatus on which this objective lens and/or the light converging optical system is mounted. Further, the object of the present invention is to provided a recording-reproducing apparatus on which this optical pickup apparatus is mounted.

In order to attain the above objects, the first objective lens according to the present invention is characterized in that: it is an objective lens for the recording and/or reproducing of the information of the optical information recording medium; it is a single lens having aspherical surface on at least one surface; it is a finite conjugation type to light converge the divergent luminous flux from the light source onto the information recording surface of the optical information recording medium; and it satisfies the following expression (1).

$$NA \geq 0.70 \qquad (1)$$

Where, NA: a predetermined image side numerical aperture necessary for conducting the recording and/or reproducing onto the optical information recording medium.

As the first objective lens, when a predetermined image side numerical aperture (NA) of the objective lens necessary for conducting the recording and/or reproducing onto the optical information recording medium is increased more than 0.70 (conventional optical information recording medium, for example, in the CD, 0.45, and in the DVD, 0.60), because the size of the spot which is light converged onto the information recording surface can be reduced, the recording the information with the higher density and/or the reproduction of the information recorded with the higher density than the conventional optical information recording medium becomes possible onto the optical information recording medium. Further, when the above objective lens is the finite conjugation type to light converge the divergent luminous flux from the light source onto the information recording surface of the optical information recording medium, even when it is a high NA, because the working distance can be largely secured, the contact of the objective lens with the optical information recording medium due to the warp of the optical information recording medium can be prevented. Further, when the objective lens is the finite conjugation type as described above, because a coupling lens by which the divergent light from the light source is converted into almost parallel light, is unnecessary, the number of parts of the optical pickup apparatus can be reduced, and the cost can be reduced. In this specification, the coupling lens is a lens to change a divergent degree of the divergent light flux emitted from the light source and to let the light flux to be incident into the objective lens.

In this connection, the finite conjugation type objective lens is an objective lens in which, generally, both of mutually conjugate object point and the image point are not infinite, and are in a finite position, and other than the objective lens by which the divergent luminous flux from the actual object point in the finite position is light converged onto the information recording surface of the optical information recording medium, the objective lens by which the converging luminous flux toward the imaginary object point in the finite position is light converged onto the information recording surface of the optical information recording medium, is included, however, the finite conjugation type objective lens according to the present invention is the objective lens to light converge the diverging luminous flux from the actual object point in the finite position onto the information recording surface of the optical information recording medium.

Further, in order to more accurately correct the spherical aberration and coma, it is preferable that both surfaces are made aspherical surfaces.

Further, it is preferable that the objective lens satisfies the following expression (2).

$$0.01 \leq |m| \leq 0.30 \qquad (2)$$

Where, m: when the object side numerical aperture of the objective lens is $NA_{OBJ}$, image side numerical aperture is $NA_{IMG}$, the lateral magnification of the objective lens defined by $NA_{OBJ}/NA_{IMG}$.

When the above objective lens does not exceed the upper limit of the expression (2), because the incident angle of the ray of light onto the surface of the light source side is not too large, the aberration deterioration due to the eccentricity error of the surface eccentricity can be suppressed small. Further, the interval between the objective lens and the light source is not too small, the arrangement of the optical element such as the polarizing beam splitter or wavelength plate becomes easy. When the lower limit of the expression (2) is not exceeded, because the distance between images is not too small, the size of the optical pickup apparatus to be mounted with the objective lens according to the present invention can be reduced. The expression (2') is more preferable than the expression (2).

$$0.01 \leq |m| \leq 0.20 \qquad (2')$$

Further, it is preferable that the above objective lens satisfies the following expression (3).

$$0.8 \leq d/f \leq 2.4 \qquad (3)$$

Where, d: the thickness (mm) on the optical axis of the objective lens, f: a focal length (mm) of the objective lens.

The above expression (3) is a condition for finely correcting the coma and astigmatism while assuring the working distance. Because the incident angle of the ray of light onto the surface of the light source side is not too large when more than the lower limit of the expression (3), the objective lens having the small aberration deterioration due to the eccentricity error of the surface eccentricity is possible. Further, when not more than upper limit of the expression (3), because the thickness on the optical axis of the objective lens is not too large, even when it is a small diameter, the objective lens whose working distance is large can be made.

Further, it is preferable that the above objective lens satisfies the following expression (4).

$$0.8 < r1/((n-1) \cdot f \cdot \sqrt{(1+|m|)}) < 1.6 \qquad (4)$$

Where, r1: the paraxial radius of curvature (mm) of the surface of the light source side of the objective lens, n: refractive index on the using wavelength of the objective lens.

The above expression (4) mainly relates to the correction of the coma, and when r1 is decreased apart from the lower limit of the expression (4), a flare due to the introversive coma and the extroversive coma is generated, and when r1 is increased apart from the upper limit, the extroversive coma is generated and in addition to it, the under-flare of the spherical aberration is easily generated.

Further, it is preferable that the above objective lens satisfies the following expression (5):

$$0.25 \leq (X1-X2)(n-1)/NA \cdot f \cdot \sqrt{(1+|m|)}) \leq 0.75 \qquad (5)$$

Where, X1: the difference in the optical axis direction between the surface which is perpendicular to the optical axis and is brought into contact with the top of the surface of the light source side, and the surface of the light source side on the effective diameter outermost periphery (the position on the surface of the light source side onto which the above NA marginal ray of light is incident), and on the basis of the above tangential plane, X1 is defined that the case where measured in the direction of the optical information recording medium, is positive, and the case where measured in the direction of the light source, is negative, and X2: the difference in the optical axis direction between the surface which is perpendicular to the optical axis and is brought into contact with the top of the surface of the optical information recording medium side, and the surface of the optical information recording medium side on the effective diameter outermost periphery (the position on the surface of the optical information recording medium side onto which the above NA marginal ray of light is incident), and on the basis of the above tangential plane, X2 is defined that the case where measured in the direction of the optical information recording medium, is positive, and the case where measured in the direction of the light source, is negative.

The above expression (5) is a conditional expression relating to the sag amount of the surface of the light source side to finely correct the spherical aberration and the surface of the optical information recording medium side. Because, as X1 is positive and the absolute value is smaller, or X2 is negative and the absolute value is smaller, the effect to make the spherical aberration of the marginal ray of light over correction is increased, and as X1 is positive and the absolute value is larger, or X2 is negative and the absolute value is larger, the effect to make the spherical aberration of the marginal ray of light under correction is increased, in order to correct the spherical aberration, it is necessary that X1−X2 is within a certain range. From the above description, it is preferable that the objective lens of the present invention satisfies the expression (5), and when more than the lower limit of the expression (5), the spherical aberration of the marginal ray of light is not over correction, and when under the upper limit, the spherical aberration of the marginal ray of light is not under correction.

Further, the second objective lens according to the present invention is an objective lens for the recording and/or reproducing of the information of the optical information recording medium, and a single lens having an aspherical surface on at least one surface, and a finite conjugation type to light converge the diverging luminous flux from the light source onto the information recording surface of the optical information recording medium, and is an objective lens characterized in that it has a ring-shaped diffractive structure on at least one surface and satisfies the following expression (6).

$$NA \geq 0.70 \tag{6}$$

Where, NA: a predetermined image side numerical aperture necessary for recording and/or reproducing onto the optical information recording medium.

When at least one surface is a diffractive surface having the ring-shaped diffractive structure as the second objective lens, because the longitudinal chromatic aberration generated in the objective lens which becomes a problem when the using wavelength is shortened, can be finely corrected by appropriately combining the diffractive action by the diffractive structure and the refractive action as the refractive lens, even when the instant wavelength variation by the mode hop phenomenon of the laser light source is generated, the objective lens whose aberration deterioration is suppressed small can be obtained.

Further, each objective lens is preferable that the using wavelength is not larger than 600 nm and it is formed of an optical material whose internal transmittance is not lower than 85% in the 3 mm thickness in the using wavelength range. As described above, when the using wavelength is not larger than 600 nm, because the size of the spot to light converge onto the information recording surface can be smaller, the recording with the higher density than the conventional optical information recording surface and/or the reproduction of the high density recorded information becomes possible onto the optical information recording medium. Further, when the objective lens according to the present invention is formed of an optical material whose internal transmittance is not lower than 85% in the 3 mm thickness in the using wavelength range, the absorption of the light by the optical material due to the shortening of the wavelength of the using wavelength can be suppressed small. Thereby, because the output of the light source when the information is recorded onto the optical information recording medium is enough to be small, the life of the light source can be extended, and the S/N ratio of the reading signal when the information is reproduced, can be improved.

Further, in the above second objective lens, the light source generates the wavelength variation not higher than ±10 nm, and it is preferable that the diffractive structure has a function to suppress the longitudinal chromatic aberration generated by the refractive index dispersion of the optical material of the objective lens followed by the wavelength variation of the light source. That is, when the light source is wavelength varied onto the long wavelength side, the longitudinal chromatic aberration generated by the refractive index dispersion of the optical material is in the direction in which the back focus of the objective lens becomes long as compared to before the wavelength variation, however, when the light source is wavelength varied onto the long wavelength side, the longitudinal chromatic aberration generated by the diffractive structure is in the direction in which the back focus of the objective lens becomes short as compared to before the wavelength variation. In order to be a condition in which the longitudinal chromatic aberration of the wave front light converged onto the information recording surface is finely corrected, it is preferable that the diffractive power and the refractive power are appropriately combined, and the largeness of the longitudinal chromatic aberration generated by the diffractive structure is made almost equal to the longitudinal chromatic aberration generated by the refractive index dispersion of the optical material.

Further, in order to more accurately correct the spherical aberration and coma by the second objective lens, it is preferable that both surfaces are aspherical.

Further, it is preferable that the second objective lens satisfies the following expression (7).

$$0.01 \leq PD/PT \leq 0.20 \tag{7}$$

Where, PD: when the diffractive structure formed on the i-th surface is expressed by the optical path difference function defined by $\Phi b = b_{2i} h_2 + b_{4i} h_4 + b_{6i} h_6 + \ldots$ (herein, h is the height (mm) from the optical axis, and $b_{2i}$, $b_{4i}$, $b_{6i}$, ... are respectively the second order, 4-th order, 6-th order ... optical path difference coefficients), and the power (mm$^{-1}$) of only the diffractive structure defined by $PD = \Sigma (-2 \cdot b_{2i})$, PT: the power (mm$^{-1}$) of the objective lens total system in which the power as the refractive lens and the diffractive power structure are combined.

As described above, when the diffractive structure of the objective lens is determined so as to satisfy the expression (7), the longitudinal chromatic aberration generated in the objective lens to the wavelength not larger than 600 nm, can be finely corrected. In more than lower limit of the expression (7), the longitudinal chromatic aberration of the wave front when the spot is formed onto the information recording surface of the optical information recording medium is not too under correction, and in lower than upper limit of the expression (7), the longitudinal chromatic aberration of the wave front when the spot is formed onto the information recording surface of the optical information recording medium is not too over correction.

Further, when, in the second objective lens, the reference wavelength is $\lambda$ (mm), focal length of the objective lens total system is f (mm), the number of orders of the diffracted light having the maximum diffracted light amount in the diffracted light generated in the diffractive structure formed on the i-th surface is ni, number of ring bands of the diffractive structure within the effective diameter of the i-th surface is Mi, and the minimum value of the interval of the adjoining ring bands of the diffractive structure within the effective diameter of the i-th surface is Pi (mm), it is preferable that the second objective lens satisfies the following expression (8).

$$0.01 \leq f \cdot \lambda \cdot \Sigma(ni/(Mi \cdot Pi^2)) \leq 0.70 \qquad (8)$$

As described above, when the diffractive structure of the objective lens is determined so as to satisfy the expression (8), the longitudinal chromatic aberration generated in the objective lens to the wavelength not larger than 600 nm can be finely corrected. In more than the lower limit of the expression (8), the longitudinal chromatic aberration of the wave front when the spot is made onto the information recording surface of the optical information recording medium is not too under correction, and in lower than the upper limit of the expression (8), the longitudinal chromatic aberration of the wave front when the spot is made onto the information recording surface of the optical information recording medium is not too over correction.

Further, it is preferable that the second objective lens satisfies the following expression (9).

$$0.2 \leq |(Ph/Pf)-2| \leq 10.0 \qquad (9)$$

Where, Pf: the ring-shaped diffractive zone interval (mm) in the predetermined image side numerical aperture necessary for conducting the recording and/or reproducing onto the optical information recording medium, Ph: the ring-shaped diffractive zone interval (mm) in ½ numerical aperture of the predetermined image side numerical aperture necessary for conducting the recording and/or reproducing onto the optical information recording medium.

As described above, because when the ring band interval of the diffractive structure, that is, the interval between the ring bands in the perpendicular direction to the optical axis satisfies the expression (9), the spherical aberration at the time of wavelength variation can also be finely corrected, the position adjustment in the optical axis direction of the coupling lens or objective lens or the light source when the laser light source having the oscillation wavelength dislocated from the reference wavelength is assembled into the optical pickup apparatus becomes unnecessary, and the very large reduction of the assembling time of the optical pickup apparatus can be attained. When the optical path difference function has only the second order optical path difference function coefficient (called also the diffractive surface coefficient), (Ph/Pf)-2=0, however, because the objective lens according to the present invention finely corrects the change of the spherical aberration generated due to the minute wavelength change from the reference wavelength by the action of the diffraction, the high order optical path difference function coefficient of the optical path function is used. In this case, it is preferable that (Ph/Pf)-2 is the value which is some degree apart from 0, and when it satisfies the expression (9), the change of the spherical aberration due to the wavelength change can be finely cancelled by the action of the diffraction. In higher than the lower limit of the expression (9), the spherical aberration when the wavelength changes from the reference wavelength is not too over correction, and in lower than the upper limit of the expression (9), the spherical aberration when the wavelength changes from the reference wavelength is not too under correction, Further, in the case where the diffractive action as the diffractive lens and the refractive action as the refractive lens are combined, when the wavelength of the light source is changed toward the long wavelength side, the above second objective lens has the longitudinal chromatic aberration characteristic which changes toward the direction in which the back focus is shortened, and it is preferable that it satisfies the following expression (10).

$$-1 < \Delta CA/\Delta SA < 0 \qquad (10)$$

Where, $\Delta CA$: the change amount (mm) of the longitudinal chromatic aberration to the change of the wavelength, $\Delta SA$: the change amount (mm) of the spherical aberration of the marginal ray of light to the change of the wavelength In the objective lens, when the longitudinal chromatic aberration is made over correction by the diffractive action, and the spherical aberration curve of the reference wavelength and the spherical aberration curve on the long·short wavelength side (called also the spherical aberration of the color) are crossed, the movement of the optimum writing position when the wavelength of the light source is varied can be suppressed small, and the objective lens in which the mode hop phenomenon of the light source or the deterioration of the wave front aberration is small when the high frequency is superimposed, can be made. Further, by the diffractive action, when the chromatic aberration is corrected as described above, because the interval of the ring-shaped diffractive zones can be more increased than the case where both of the longitudinal chromatic aberration and the spherical aberration of the color are corrected, the shortening of the processing time of the molding die, and the prevention of the lowering of the diffraction efficiency by the production error of the ring band shape can be attained.

Further, it is preferable that, in the second objective lens, the ni-th order diffracted light amount generated in the diffractive structure formed on the i-th surface is larger than any other order diffracted light amount, and the ni-th order diffracted light generated in the diffractive structure for recording and/or reproducing the information onto the optical information recording medium can be light converged onto the information recording surface of the optical information recording medium. Herein, n is an integer other than 0, ±1.

The above structure relates to the objective lens to conduct the recording and/or reproducing of the information onto the optical information recording medium by using the diffracted light of the higher order than second order, and when the ring-shaped diffractive structure is formed so that the diffraction efficiency of the diffracted light of the higher order than second order becomes maximum, the step difference between each ring band and the interval between each ring band are increased, and the shape requirement accuracy of the diffractive structure is not too severe. Generally, as compared to the case where the first order diffracted light is used, in the case where the diffracted light of the higher order than second order is used, the lowered amount due to the wavelength change of the diffraction efficiency is large, however, in the case where the light source near the single wavelength is used, because the lowered amount due to the wavelength change of the diffraction efficiency is as small as almost negligible, the objective lens which is easily produced, and has the diffractive structure having the sufficient diffraction efficiency, can be obtained.

Further, it is preferable that the second objective lens satisfies the following expressions (11) to (14).

$$0.01 \leq |m| \leq 0.30 \tag{11}$$

$$0.8 \leq d/f \leq 2.4 \tag{12}$$

$$0.8 < r1/((n-1) \cdot f \cdot \sqrt{(130\ |m|)}) < 1.6 \tag{13}$$

$$0.25 \leq (X1-X2)(n-1)/NA \cdot f \cdot \sqrt{(1+|m|)}) \leq 0.75 \tag{14}$$

Where, m: the lateral magnification of the objective lens defined by $NA_{OBJ}/NA_{IMG}$ when the object side numerical aperture of the objective lens is $NA_{OBJ}$, and the image side numerical aperture is $NA_{IMG}$, d: the thickness (mm) in the optical axis of the objective lens, f: the focal length (mm) of the total system of the objective lens, r1: the paraxial radius of curvature (mm) of the surface of the light source side of the objective lens, n: the refractive index in the using wavelength of the objective lens, X1: the difference between the plane perpendicular to the optical axis and tangent to the top of the surface of the light source side, and the surface of the light source side in the effective diameter outermost periphery (the position on the surface of the light source side onto which the marginal ray of light of the NA is incident) and in the case where it is measured in the direction of the optical information recording medium on the basis of the tangential plane, it is positive, and in the case where measured in the direction of the light source, it is negative, X2: the difference in the optical axis direction between the plane which is perpendicular to the optical axis, and tangent to the top of the surface of the optical information recording medium side, and the surface of the optical information recording medium side in the effective diameter outermost periphery (the position on the surface of the optical information recording medium side onto which the marginal ray of light of the NA is incident), and in the case where it is measured in the direction of the optical information recording medium on the basis of the tangential plane, it is positive, and in the case where measured in the direction of the light source, it is negative.

When, in the above objective lens, the lateral magnification does not exceed the upper limit of the expression (11), the incident angle of the ray of light onto the surface of the light source side is not too large, the aberration deterioration due to the eccentricity error such as the surface eccentricity can be suppressed small. Further, because the distance between the objective lens and the light source is not too small, the arrangement of the optical element such as the polarized beam splitter or the wavelength plate becomes easy. When it does not exceed the lower limit of the expression (11), because the distance between the object and image of the objective lens is not too small, the size of the optical pickup apparatus on which the objective lens according to the present invention is mounted, can be reduced. It is more preferable that the expression (11) is the following expression (11').

$$0.01 \leq |m| \leq 0.20 \tag{11'}$$

Further, the above expression (12) is a condition to finely correct the coma and the astigmatism while assuring the working distance, and because, in more than the lower limit of the expression (12), the incident angle of the ray of light onto the surface of the light source side is not too large, the objective lens whose aberration deterioration is small due to the eccentricity error such as the surface eccentricity, can be obtained. Further, because the astigmatism in the image height characteristic is not too large, the objective lens whose image height characteristic is fine can be obtained. Further, in lower than the upper limit of the expression (12), because the thickness on the optical axis of the objective lens is not too large, even when its diameter is small, the objective lens in which the working distance is large, can be obtained.

Further, the above expression (13) relates mainly to the correction of the coma, and when r1 is apart from the lower limit of the expression (13) and is reduced, the flare due to the introversive coma and the extroversive coma is generated, and when r1 is apart from the upper limit and is increased, the extroversive coma is generated and together with it, the under flare of the spherical aberration is easily generated.

Further, the above expression (14) is a conditional expression relating to a sag amount of the surface of the light source side and the surface of the optical information recording medium side to finely correct the spherical aberration, and because, as X1 is positive and its absolute value is small, or X2 is negative and its absolute value is small, the effect to make the spherical aberration of the marginal ray of light over correction is increased, and as X1 is positive and its absolute value is large, and as X2 is negative and its absolute value is large, the effect to make the spherical aberration of the marginal ray of light under correction is increased, in order to correct the spherical aberration, it is necessary that X1–X2 is within some range. As described above, it is preferable that the objective lens of the present invention satisfies the expression (14), and in more than lower limit of the expression (14), the spherical aberration of the marginal ray of light is not too over correction, and in lower than the upper limit of the expression (14), the spherical aberration of the marginal ray of light is not too under correction.

Further, in the above each objective lens, in the spherical aberration in which the objective lens has, when the third order spherical aberration component is SA1, and the sum of more than fifth order and high order spherical aberration component is SA2, it is preferable that it satisfies the following expression (15).

$$|SA1/SA2| > 1.0 \tag{15}$$

Where, SA1: the third order spherical aberration component when the aberration function is developed into Zernike's polynomials, SA2: the square root of the square sum of the fifth order spherical aberration component and the seventh order spherical aberration component and the ninth order spherical aberration component when the aberration function is developed into Zernike's polynomials.

The above expression (15) relates to a preferable distribution of the spherical aberration component in which the objective lens has, and when the spherical aberration component remaining in the objective lens by the production error satisfies the expression (15), the remaining spherical aberration of the coupling lens or the objective lens after the third order spherical aberration component correction due to the position adjustment on the optical axis of the light source, can be reduced. This third order spherical aberration component correction may be conducted by a spherical aberration correction means provided in the optical path of the light source and the information recording surface. The production error which is a cause of the spherical aberration generation is, for example, the lens thickness error on the optical axis, or the surface shape error.

Further, when the above each objective lens is formed of the optical plastic material, the mass production can be cheaply conducted by the molding method using the metallic die. Further, because it is light, the lightening of the burden onto the actuator for focusing, high speed follow, and the drive by the small sized actuator become possible.

Further, when the above each objective lens is formed of the optical glass material, because the curvature of the surface of the light source side is not too small, the aberration deterioration due to the eccentricity error can be reduced. Further, when it is produced by the molding method using the metallic die, because the angle (prospective angle) formed between the normal of the surface of the light source side and the optical axis at the position onto which the marginal ray of light is incident, is not too large, the manufacturing error of the metallic die is not too large.

Further, it is preferable that, to the above each objective lens, a diaphragm to regulate the luminous flux is provided between the plane which is perpendicular to the optical axis and tangential to the top of the surface of the light source side, and the surface of the light source side. As described above, when the diaphragm to regulate the luminous flux is arranged just before the surface of the light source side, it is preferable that it is arranged between the plane which is perpendicular to the optical axis and tangential to the top of the surface of the light source side, and the surface of the light source side. Thereby, the interval between the diaphragm and the surface of the light source side is reduced, and because it can be prevented that the ray of light passes through the higher portion than the area in which the spherical aberration is guaranteed, even when the divergent light is incident onto the objective lens, there is no possibility that the aberration is increased.

Further, it is preferable that, when the diaphragm is provided to the above each objective lens, by providing a position at which the normal direction of the surface changes non-continuously at the position corresponding to the image side numerical aperture necessary for conducting the recording and/or reproducing of the information onto the optical information recording medium on at least one surface, the light converging luminous flux diameter is regulated.

As described above, when the diaphragm is provided to the above each objective lens, the luminous flux passing the outside surface more than a position at which the normal direction of the surface changes non-continuously can be light converged onto the different point from the position in the case of the luminous flux passing the surface on the light source side more than a position at which the normal direction of the refractive surface changes non-continuously. It is preferable that a position at which the normal direction of the surface changes non-continuously is provided on the surface on the light source side. When a position at which the normal direction of the surface changes non-continuously and the lens to which a position at which the normal direction of the surface changes non-continuously is provided, are integrally molded, because there is no necessity that the diaphragm of another member is attached to the objective lens, the reduction of the manufacturing time or cost reduction can be attained. Further, because the diaphragm is not necessary when a bobbin is molded, the total weight of the drive section including the objective lens and the bobbin can be reduced.

Further, the light converging optical system according to the present invention is a light converging optical system for recording and/or reproducing of the information of the optical information recording medium including the finite conjugation type objective lens by which the divergent luminous flux from the light source is light converged onto the information recording surface of the optical information recording medium, and the objective lens is a single lens, and between the light source and the information recording surface, a means for correcting the variation of the spherical aberration generated in the light converging optical system is provided, and is characterized in that it satisfies the following expression (16).

$$NA \geq 0.65 \tag{16}$$

Where, NA: a predetermined image side numerical aperture of the objective lens necessary for conducting the recording and/or reproducing onto the optical information recording medium.

According to each objective lens described above, even when it is a high NA objective lens, or even when it is an objective lens having a small diameter and a large working distance, or the using wavelength is a short wavelength, a high NA objective lens in which the longitudinal chromatic aberration generated due to the mode hop of the laser light source is effectively corrected, is obtained, however, when the recording density is increased by using the objective lens with such a large NA and the light source with a shorter wavelength, the variation of the spherical aberration due to the influence of the above various errors can not be negligible. Accordingly, as described above, when a means for correcting the variation of the spherical aberration is provided between the light source and the information recording surface of the optical information recording medium, even when there are various errors, the light converging optical system by which the fine light converging characteristic can be maintained, can be obtained.

As a cause of the variation of the above spherical aberration, specifically, a refractive index change of the optical plastic material generated due to a fluctuation of the oscillation wavelength between individuals of the laser light source, and the change of the temperature and humidity, a variation of the thickness of the protective layer of the optical information recording medium, or a production error (the surface shape error, the thickness error on the optical axis) can be listed. When a means for correcting the variation of the spherical aberration (particularly, the third order spherical aberration) generated due to these various causes is provided, there are following advantages (1) to (4), and a light converging optical system by which the fine light converging characteristic can be always maintained, can be obtained.

(1) Because the selection of the laser light source is not necessary, and the requirement for the production accuracy is not too severe, the mass productivity of the laser light source can be increased. Further, the reduction of the production time of the optical pickup apparatus can be attained.

(2) The structural elements included in the light converging optical system can be formed of the plastic material, and the large cost reduction can be attained.

(3) Because the required accuracy for the production error of the optical information recording medium is not too severe, the mass productivity of the optical information recording medium can be increased.

(4) Because the requirement for the production accuracy for the objective lens is not too severe, the mass productivity of the objective lens can be increased.

It is preferable that the means for correcting the variation of the spherical aberration in the light converging optical system includes at least one movable element by which the divergent degree of the luminous flux emitted by displacing along the optical axis can be changed, between the light source and the objective lens. When it is the structure including at least one such movable element, the variation of the spherical aberration can be finely corrected by a simple structure.

Further, when it is structured that the movable element can displace at least one lens group constituting the coupling lens arranged in the optical path of the light source and the objective lens along the optical axis direction, even when it is the structure having small number of components, the light converging optical system in which the light converging condition is always good, can be structured. It is preferable that the coupling lens is 1-group 1-lens structure.

Further, when the movable element which can be displaced along the optical axis, is formed of the light optical plastic material, the lightening of the burden onto the actuator or the high speed response to the variation of the spherical aberration becomes possible.

Further, it is preferable that the means for correcting the variation of the spherical aberration is an element which is arranged between the light source and the objective lens, and by which the refractive index distribution along the direction perpendicular to the optical axis can be displaced. For example, when the variation of the spherical aberration is tried to be corrected by the apparatus by which the refractive index distribution along the direction perpendicular to the optical axis is generated by the voltage application, the light converging optical system which has no movable portion and has a mechanically simple structure, can be obtained.

Further, it is preferable that the means for correcting the variation of the spherical aberration is an element which is arranged between the objective lens and the optical information recording medium and in which the refractive index is changeable. In this manner, when the element whose refractive index distribution is changeable is arranged in the optical path between the objective lens and the optical information recording medium, because the inclination angle of the marginal ray of light incident onto the element whose refractive index distribution is changeable is larger in the case where it is arranged on the optical information recording medium side than the case where it is arranged on the light source side from the objective lens, the variation of larger spherical aberration can be corrected by the minute refractive index distribution change. Thereby, the reduction of the drive voltage of the element whose refractive index distribution is changeable, and the size reduction of the element whose refractive index distribution is changeable, can be attained.

Further, the above light converging optical system is a light converging optical system by which the recording and/or reproducing of the information is possible from the same luminous flux incident surface side onto a plurality of information recording layer, and it is preferable that, at the time of the focus jump between information recording layers, the variation of the spherical aberration generated due to the difference of the thickness of the transparent substrate from the luminous flux incident surface to respective information recording layers is corrected by the means for correcting the variation of the spherical aberration.

This structure relates to a light converging optical system used for the optical pickup apparatus by which the recording and/or reproducing of the information onto the multi-layer recording type optical information recording medium is possible. Because, at the time of the focus jump between information recording layers, the variation of the spherical aberration generated due to the difference of the thickness of the transparent substrate from the luminous flux incident surface to respective information recording layers is corrected by the spherical aberration correcting means, even when it is the next generation optical pickup apparatus using the objective lens of high numerical aperture more than 0.65, the recording and/or reproducing of the information onto the multi-layer recording type optical information recording medium can be conducted.

Further, it is preferable that the using wavelength is not larger than 600 nm, and the ring-shaped diffractive structure is provided on at least one surface of the optical element constituting the light converging optical system.

As described above, when the wavelength when the recording and/or reproducing of the information onto the optical information recording medium is conducted, is not larger than 600 nm, the information can be recorded with the higher density, or can reproduce the information which is recorded with higher density. When such the short wavelength light source is used, it is preferable that the diffractive structure is provided on at least one surface of the optical element constituting the light converging optical system, and because the diffractive structure has the wavelength characteristic in which the back focus of the objective lens is reduced when the wavelength of the light source is minutely varied toward the long wavelength side, the longitudinal chromatic aberration generated in the objective lens which is a problem when the short wavelength light source such as the blur violet semiconductor laser is used, can be effectively corrected. When the optical element on which the diffractive structure is provided, is provided, separately from the objective lens, between the light source and the objective lens, even the objective lens by which the longitudinal chromatic aberration is not severely corrected, it can be applied for the light converging optical system according to the present invention. The diffractive structure may be provided on the optical element separately arranged from the optical element constituting the light converging optical system, however, when it is provided on the optical surface of the optical element constituting the light converging optical system, the number of components of the light converging optical system is not increased, therefore, it is preferable.

Further, it is preferable that the light source generates the variation of the wavelength not larger than ±10 nm, and the diffractive structure has a function to suppress the longitudinal chromatic aberration generated by the refractive index dispersion of the optical material of the optical element constituting the light converging optical system, accompanied by the variation of the wavelength of the light source. That is, when the light source varies the wavelength toward the long wavelength side, the longitudinal chromatic aberration generated by the refractive index dispersion of the optical material of the optical element constituting the light converging optical system is in the direction in which the back focus of the light converging optical system becomes long as compared to before the wavelength variation, however, when the light source varies the wavelength toward the long wavelength side, the longitudinal chromatic aberration generated by the diffractive structure is in the direction in which the back focus of the light converging optical system becomes short as compared to before the wavelength variation. In order to be the condition in which the longitudinal chromatic aberration of the wave front which is light converged onto the information recording surface by passing the light converging optical system is finely corrected, the diffractive power and the refractive power are appropriately combined, and the magnitude of the longitudinal chromatic aberration generated by the diffractive structure may be made almost equal to the longitudinal chromatic aberration generated by the refractive index dispersion of the optical material. In this connection, in the above description, the light converging optical system is presumed as one positive lens having the light converging action.

Further, it is preferable that the above light converging optical system has, when the diffractive action as the diffractive lens and the refractive action as the refractive lens are combined, the longitudinal chromatic aberration characteristic in which, when the wavelength of the light source is varied toward the long wavelength side, the back focus changes in the direction to be short, and it satisfies the following expression (17).

$$-1 < \Delta CA/\Delta SA < 0 \qquad (17)$$

Where, $\Delta CA$: the changed amount (mm) of the longitudinal chromatic aberration to the change of the wavelength, $\Delta SA$: the changed amount (mm) of the spherical aberration of the marginal ray of light to the change of the wavelength.

By the above diffractive action, when the longitudinal chromatic aberration of the light converging optical system total system is overly corrected, and the spherical aberration curve of the reference wavelength and the spherical aberration curve of the long·short wavelength side (called also spherical aberration of the color) are crossed, the movement of the optimum writing position when the wavelength of the light source is varied, can be suppressed small, and the light converging optical system in which the deterioration of wave front aberration is small at the time of the mode hop phenomenon of the light source or high frequency superimposition can be obtained. Further, by the diffractive action, in the light converging optical system in which the chromatic aberration is corrected as described above, because the ring-shaped diffractive zone interval can be larger than the light converging optical system in which both of the longitudinal chromatic aberration and spherical aberration of the color are corrected, the reduction of the manufacturing time of the molding die, and the prevention of the lowering of the diffraction efficiency by the production error of the ring band shape can be attained. In this connection, in the above description, the light converging optical system is presumed as a positive lens having the light converging action.

Further, it is preferable that the n order diffracted light amount generated in the diffractive structure is larger than any other order diffracted light amount, and the n order diffracted light generated in the diffractive structure to record and/or reproduce the information onto the optical information recording medium can be light converged onto the information recording surface of the optical information recording medium. Herein, n is an integer other than 0, ±1.

The above structure relates to the light converging optical system to conduct the recording and/or reproducing of the information onto the optical information recording medium by using the high order diffracted light more than 2 order, and when the ring-shaped diffractive structure is formed in such a manner that the diffraction efficiency of the diffracted light of the higher order than second order is maximum, the step difference between ring bands and the interval between ring bands become large, and the shape requirement accuracy of the diffractive structure is not too severe. Generally, as compared to the case where the first order diffracted light is used, in the case where more than second order diffracted light is used, the lowering by the wavelength change of the diffraction efficiency is large, however, when the light source near to the single wavelength is used, because the lowered amount by the wavelength change of the diffraction efficiency is as small as almost negligible, the light converging optical system having the diffractive structure which is easily produced, and has the sufficient diffraction efficiency, can be obtained.

Further, the objective lens according to any one of (1) to (21) can be applied for the above light converging optical system.

Further, the first optical pickup apparatus according to the present invention is an optical pickup apparatus, in which, by a light converging optical system to record the information of the optical information recording medium including the finite conjugation type objective lens by which the divergent luminous flux from the light source is light converged onto the information recording surface of the optical information recording medium and/or to reproduce, an optical pickup apparatus by which the light is converged onto the information recording surface of the optical information recording medium, and the information is recorded onto the information recording surface and/or the information on the information recording surface is reproduced, and the optical pickup apparatus is characterized in that: the objective lens is a single lens, and when the light source is displaced along the optical axis direction, it has the light source by which the divergent degree of the luminous flux incident onto the objective lens can be changed, and has a detection means for detecting the variation of the spherical aberration generated in the light converging optical system by detecting the reflected light from the information recording surface, and corresponding to the detection result of the detection means, has a drive means for displacing the light source along the optical axis direction in order to lower the variation of the spherical aberration.

In the optical pickup apparatus having the finite conjugation type objective lens as described above, when the light source is displaced along the optical axis, the refractive index change of the optical plastic material generated due to the fluctuation of the oscillation wavelength between individuals of the laser light source, or the variation of the spherical aberration generated due to the change of the temperature and humidity, the variation of the thickness of the protective layer of the optical information recording medium, or the production error of the objective lens (the surface shape error, the thickness error on the optical axis) can be corrected. Specifically, when the reflected light from the information recording surface is detected, while the signal in the detection means for detecting the light converging condition of the luminous flux which is light converged onto the information recording surface is being monitored, the drive means for displacing the light source along the optical axis is operated so that the spherical aberration generated in the light converging optical system is optimally corrected. As the drive means for displacing the light source along the optical axis, a piezo actuator or a voice coil type actuator can be used.

Further, the objective lens according to any one of (1) to (21) can be applied for the above optical pickup apparatus.

Further, the optical pickup apparatus according to the present invention is an optical pickup apparatus by which the diverging luminous flux from the light source is light converged onto the information recording surface of the optical information recording medium, and the information is recorded onto the information recording surface and/or the information on the information recording surface is reproduced, by the light converging optical system including the finite conjugation type objective lens by which the divergent luminous flux from the light source is light converged onto the information recording surface of the optical information recording medium, and a means for correcting the variation of the spherical aberration, and the optical pickup apparatus is characterized in that: the objective lens is a single lens, and it has the light converging optical system according to any one of (22) to (33) in the light converging optical system, and has the detection means for detecting the variation of the spherical aberration generated in the light converging optical system by detecting the reflected light from the information recording surface, and has the drive means for driving the means for correcting the variation of the spherical aberration in order to lower the variation of the spherical aberration corresponding to the detection result of the detection means.

According to the above optical pickup apparatus, when it has the light converging optical system according to (22) to (33), even the optical pickup apparatus on which the high NA objective lens is mounted, because the refractive index change of the optical plastic material generated due to the fluctuation of the oscillation wavelength between individuals of the laser light source, the change of the temperature and the humidity, and the variation of the spherical aberration generated due to the variation of the thickness of the protective layer of the optical information recording medium, the production error of the objective lens (the surface shape error, the error of the thickness on the optical axis) are corrected, the optical pickup apparatus in which the light converging condition is always fine, can be obtained. Specifically, when the reflected light from the information recording surface is detected, while the signal in the detection means for detecting the light converging condition of the luminous flux which is light converged onto the information recording surface is being monitored, the drive means for driving the means for correcting the variation of the spherical aberration is operated so that the spherical aberration generated in the light converging optical system is optimally corrected. As this drive apparatus, a voice coil type actuator or a piezo actuator can be used.

Further, the recording apparatus·reproducing apparatus of an audio·image according to the present invention is, when the first or second optical pickup apparatus is mounted, the recording or reproducing of the audio·image can be finely conducted onto the next generation optical information recording medium which has the higher density and larger capacity than the DVD.

DETAILED DESCRIPTION OF THE PREFERRED EMBODIMENT

Figure 1:
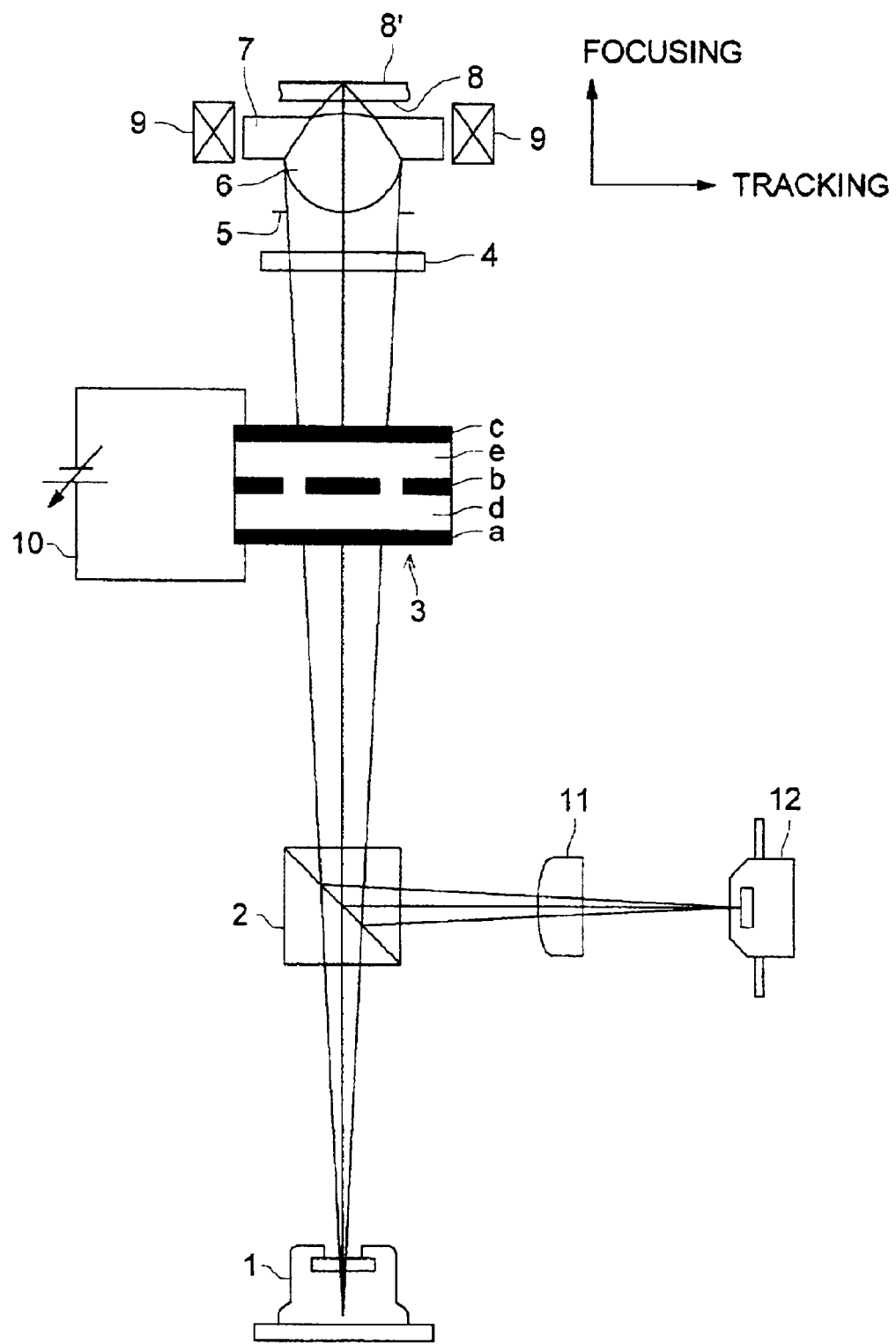
FIG. 1 is a general view of an optical pickup apparatus according to the first embodiment of the present invention.

Referring to the drawing, the optical pickup apparatus by which the divergent luminous flux from the light source is light converged onto the information recording surface of the optical information recording medium by the objective lens composed of a finite conjugation type single lens according to the present invention, of the first–fifth embodiment will be described below.

[The First Embodiment]

FIG. 1 is a view generally showing an optical pickup apparatus according to the first embodiment of the present invention.

The optical pickup apparatus in FIG. 1 is structured in such a manner that, after the luminous flux emitted from a light source 1 composed of a semiconductor laser passes a polarized light beam splitter 2, refractive index distribution variable element 3 driven by a drive means 10 which is a spherical aberration variation correction means, ¼ wavelength plate 4, and diaphragm 5, it is light converged onto an information recording surface 8' through a transparent substrate 8 of the optical information recording medium by a finite conjugation type objective lens 6. Further, it is structured in such a manner that, after the reflected light from the information recording surface 8' passes again the objective lens 6 and refractive index distribution variable element 3, it is reflected by the polarized beam splitter 2, and it passes a cylindrical lens 11 and goes toward a light detector 12.

Further, an objective lens 6 is accurately attached to the optical pickup apparatus by a flange portion 7. Further, The optical pickup apparatus in FIG. 1 is provided with a 2-axis actuator 9 to drive the objective lens 6 toward the 2-axis direction for the tracking/focusing.

In the optical pickup apparatus in FIG. 1, an element whose refractive index distribution is variable is used as the spherical aberration variation correction means, and for this refractive index distribution variable element 3, as shown in FIG. 1, an element in which electrode layers a, b, c which are respectively electrically connected and optically transparent, and refractive index distribution variable layers d, e which are electrically insulated from the electrode layers a, b, c and the refractive index distribution is changed corresponding to the applied voltage, are alternately laminated, and the electrode layers a, b, c which are optically transparent are divided into a plurality of areas, can be used.

When the variation of the spherical aberration is detected by a light detector 12, in the refractive index distribution variable element 3, the voltage is applied onto the electrode layers a, b, c by the drive means 10, and the refractive index of the refractive index distribution variable layer d, e is changed depending on the position, and the phase of the emitted light from the refractive index distribution variable element is controlled so that the variation of the spherical aberration is zero.

According to the optical pickup apparatus of the present embodiment, the luminous flux from the light source 1 is light converged onto the information recording surface 8' of the optical information recording medium by the objective lens 6 through the refractive index distribution variable element 3, and when the reflected light modulated thereby is received by a light detector 12 in the reversal path, the reproducing can be conducted. In this connection, in the same manner, the recording can be conducted onto the information recording surface of the optical information recording medium.

At the time of the above recording or reproducing, according to the detection result of the spherical aberration variation, because the drive means 10 applies the voltage onto the refractive index distribution variable element 3 and controls the phase of the emitted light of the refractive index distribution variable element 3 so that the variation of the spherical aberration is zero, while the variation of the spherical aberration generated due to the refractive index change of the optical plastic material by the change of the temperature and humidity, and due to the fluctuation of the oscillation wavelength between individuals of the laser light source, and due to the variation of the thickness of the transparent substrate of the optical information recording medium, and due to the production error of the objective lens, are corrected, the recording or reproducing can be finely conducted. As the refractive index distribution variable layer d, e, for example, a liquid crystal may be used.

Further, as described above, when the distribution of the refractive index along the direction perpendicular to the optical axis is generated by the voltage application, and the variation of the spherical aberration is corrected, the light converging optical system which has no movable portion and whose structure is mechanically simple, can be obtained. The refractive index distribution variable element 3 applicable to the optical pickup apparatus of the present invention is not limited to the embodiment of the refractive index distribution variable element 3 in the optical pickup apparatus shown in FIG. 1, it may be an element capable of adding a optical path difference in a ring-shaped form with a center at the optical axis for a transmitting wave surface.

(The Second Embodiment)

Figure 2:
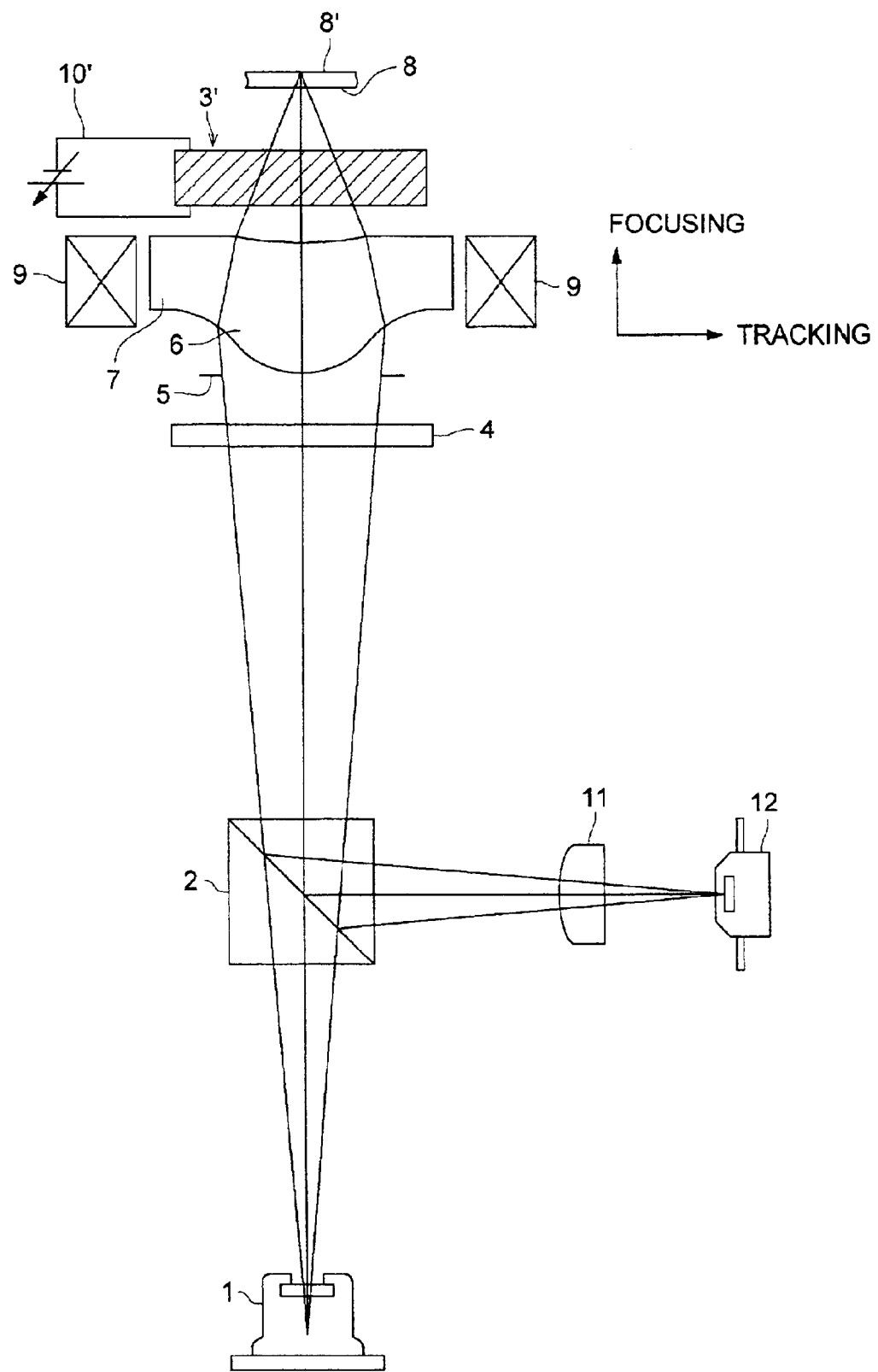
FIG. 2 is a general view of an optical pickup apparatus according to the second embodiment of the present invention.

FIG. 2 is a view generally showing the optical pickup apparatus according to the second embodiment of the present invention.

Because the optical pickup apparatus shown in FIG. 2 is basically the same structure as that in FIG. 1 except that the liquid crystal element as an element whose refractive index is variable, is arranged between the objective lens 6 and the optical recording medium, the same portion is denoted by the same reference numeral and sign, and its explanation is neglected.

In the optical pickup device shown in FIG. 2, element 3' having a variable refractive index is arranged between the objective lens and the optical information recording medium, to correct spherical aberration fluctuations. As the element 3' having a variable refractive index, an optical element whose refractive index is changed depending on voltage to be impressed, for example, can be used. After fluctuations of spherical aberration are detected by optical detector 12, a refractive index of the element 3' having a variable refractive index is changed by driving means 10' for the element 3' having a variable refractive index so that spherical aberration fluctuations may come to zero.

Since the numerical aperture on the image side of the objective lens used for the optical pickup device of the present embodiment is as great as 0.70 or more, when arranging the element 3' having a variable refractive index between the objective lens and the optical information recording medium, it is possible to correct fluctuations of greater spherical aberration with a microscopic change of refractive index, which results in a decrease of driving voltage for the element 3' having a variable refractive index and achievement of miniaturization of the element 3' having a variable refractive index. The optical pickup device shown in FIG. 2 makes it possible to obtain the same effect as in the optical pickup device in FIG. 1.

(The Third Embodiment)

Figure 3:
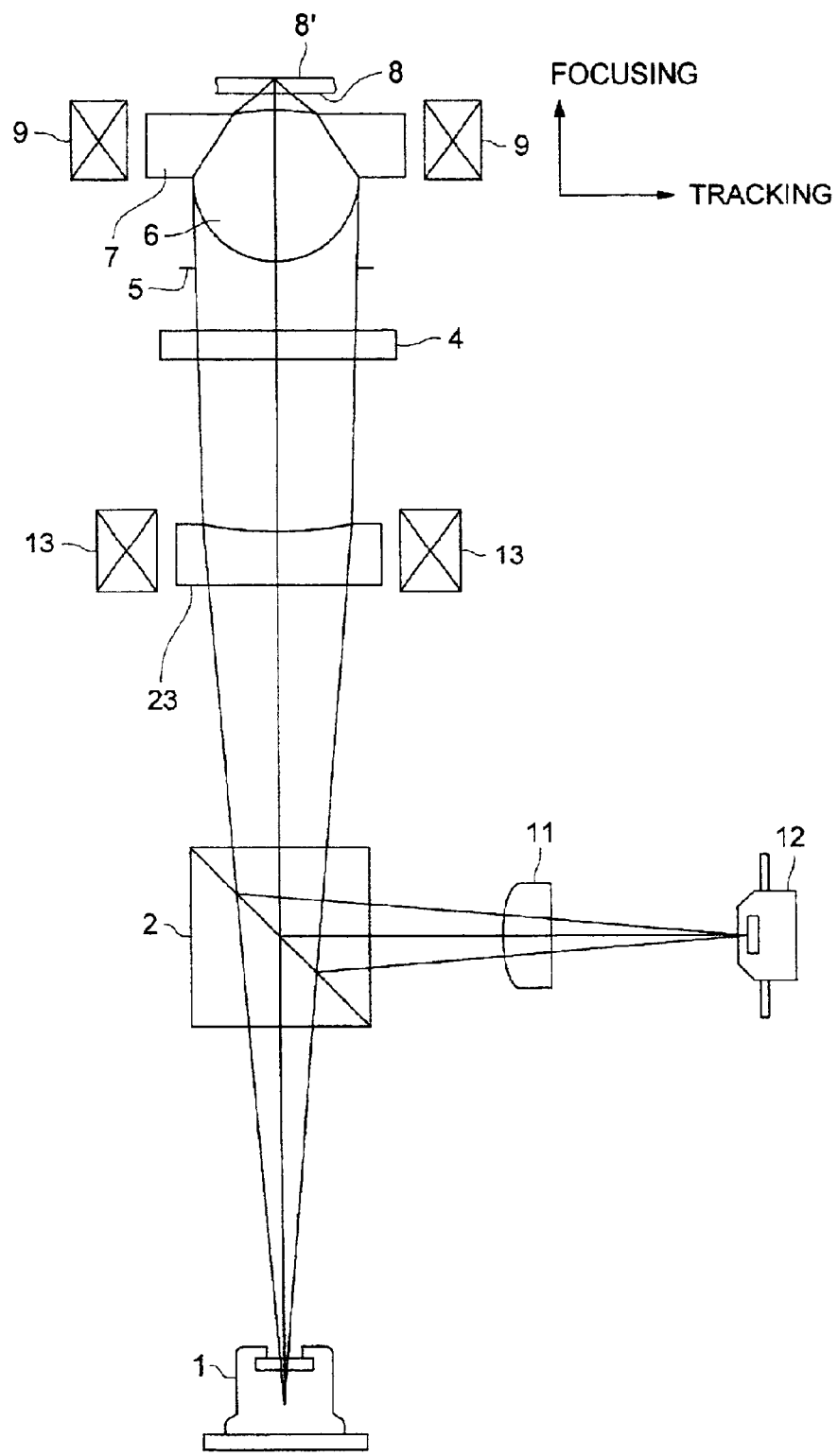
FIG. 3 is a general view of an optical pickup apparatus according to the third embodiment of the present invention.

FIG. 3 is a view generally showing the optical pickup apparatus according to the third embodiment of the present invention.

Because the optical pickup apparatus shown in FIG. 3 has the basically the same structure as in FIG. 1 except that, instead of the refractive index distribution variable element, the coupling lens is displaceable in the optical axis direction for the correction of the spherical aberration variation, the same portion is denoted by the same reference numeral and sign, and its explanation is neglected.

As shown in FIG. 3, a coupling lens 23 is structured in such a manner that it can be displaced in the optical axis direction by the one axis actuator 13 for the correction of the variation of the spherical aberration. When the variation of the spherical aberration is detected by the light detector 12, the coupling lens 23 is displaced in the optical axis direction by the one axis actuator 13 so that the spherical aberration is zero. According to the optical pickup apparatus in FIG. 3, the same effect as that in FIG. 1 can be obtained. Further, when the coupling lens is structured so as to be displaceable, even when it is the simple structure in which the number of components is small, the optical pickup apparatus in which the light converging condition is always fine, can be obtained.

(The Fourth Embodiment)

Figure 4:
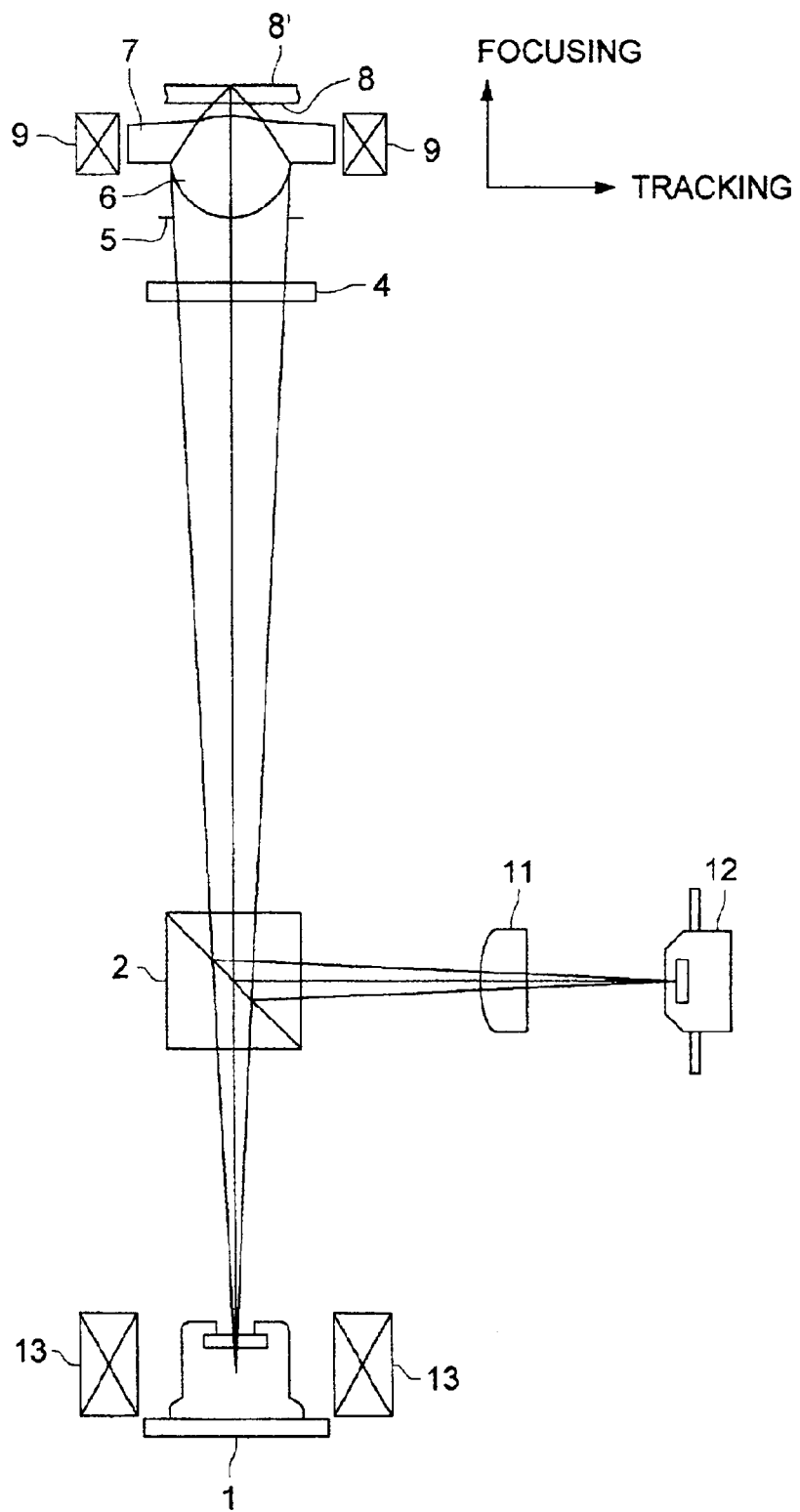
FIG. 4 is a general view of an optical pickup apparatus according to the fourth embodiment of the present invention.

FIG. 4 is a view generally showing the optical pickup apparatus according to the fourth embodiment of the present invention.

Because the optical pickup apparatus shown in FIG. 4 is basically the same structure as in FIG. 1, except that, instead of the refractive index distribution variable element, the light source is displaceable in the optical axis direction for the correction of the spherical aberration variation, the same portion is denoted by the same reference numeral and sign, and its explanation is neglected.

As shown in FIG. 4, the light source 1 is structured so as to be displaceable in the optical axis direction by the one axis actuator for the correction of the variation of the spherical aberration. When the variation of the spherical aberration is detected by the light detector 12, the light source 1 is structured so as to be displaced in the optical axis direction by the one axis actuator 13 so that the spherical aberration is zero. According to the optical pickup apparatus in FIG. 4, the same effect as that in FIG. 1 can be obtained.

(The Fifth Embodiment)

Figure 5:
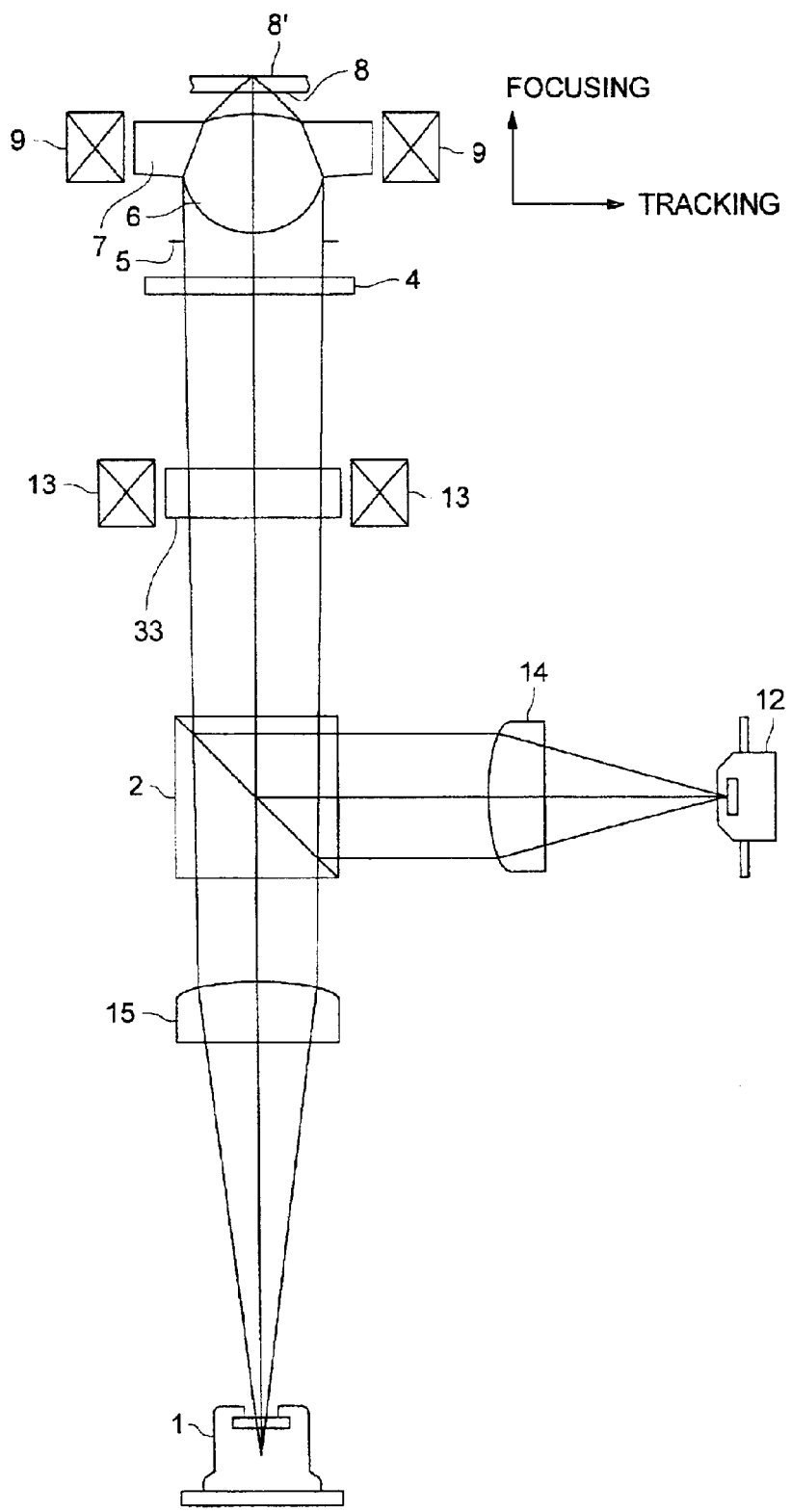
FIG. 5 is a general view of an optical pickup apparatus according to the fifth embodiment of the present invention.
Figure 6:
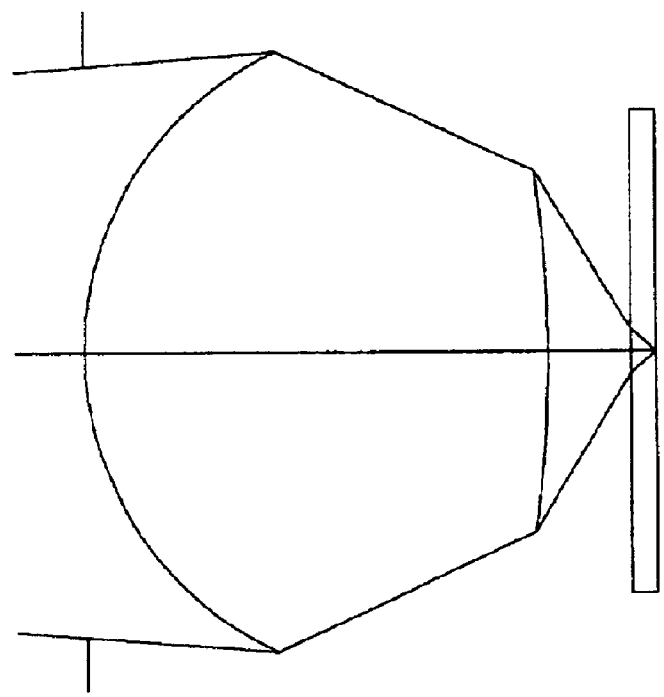
FIG. 6 is an optical path view of Example 1.
Figure 7:
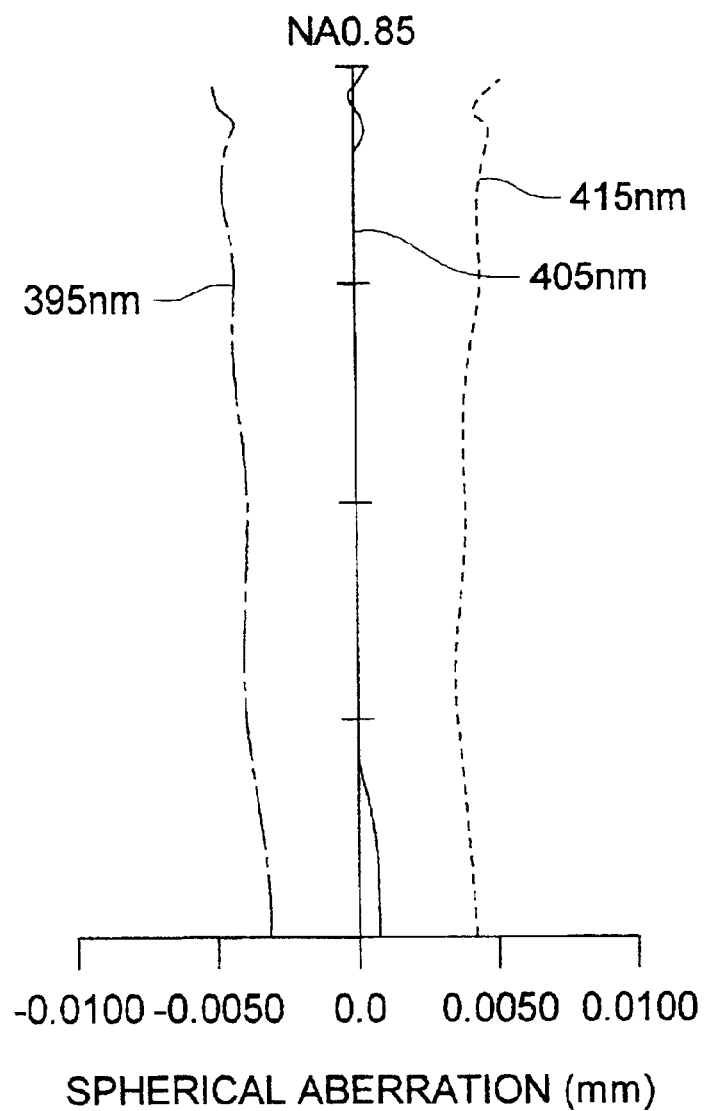
FIG. 7 is a spherical aberration view of Example 1.
Figure 8:
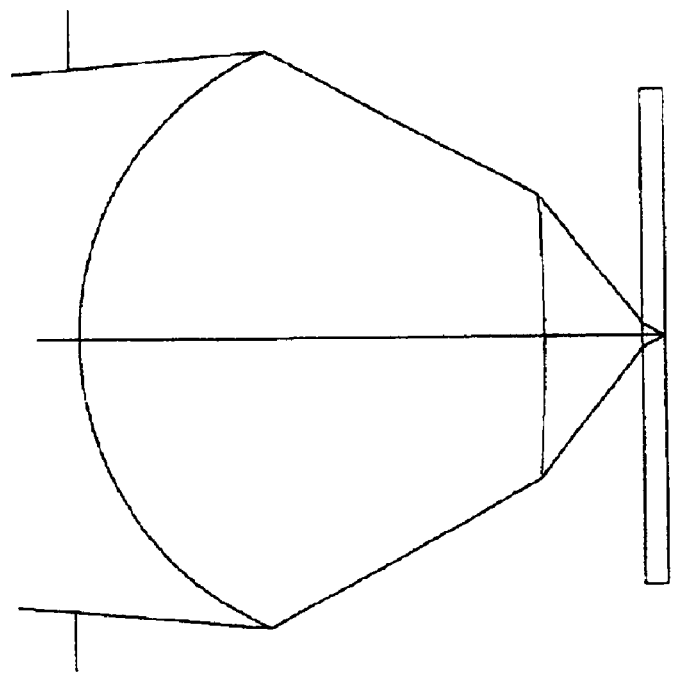
FIG. 8 is an optical path view of Example 2.
Figure 9:
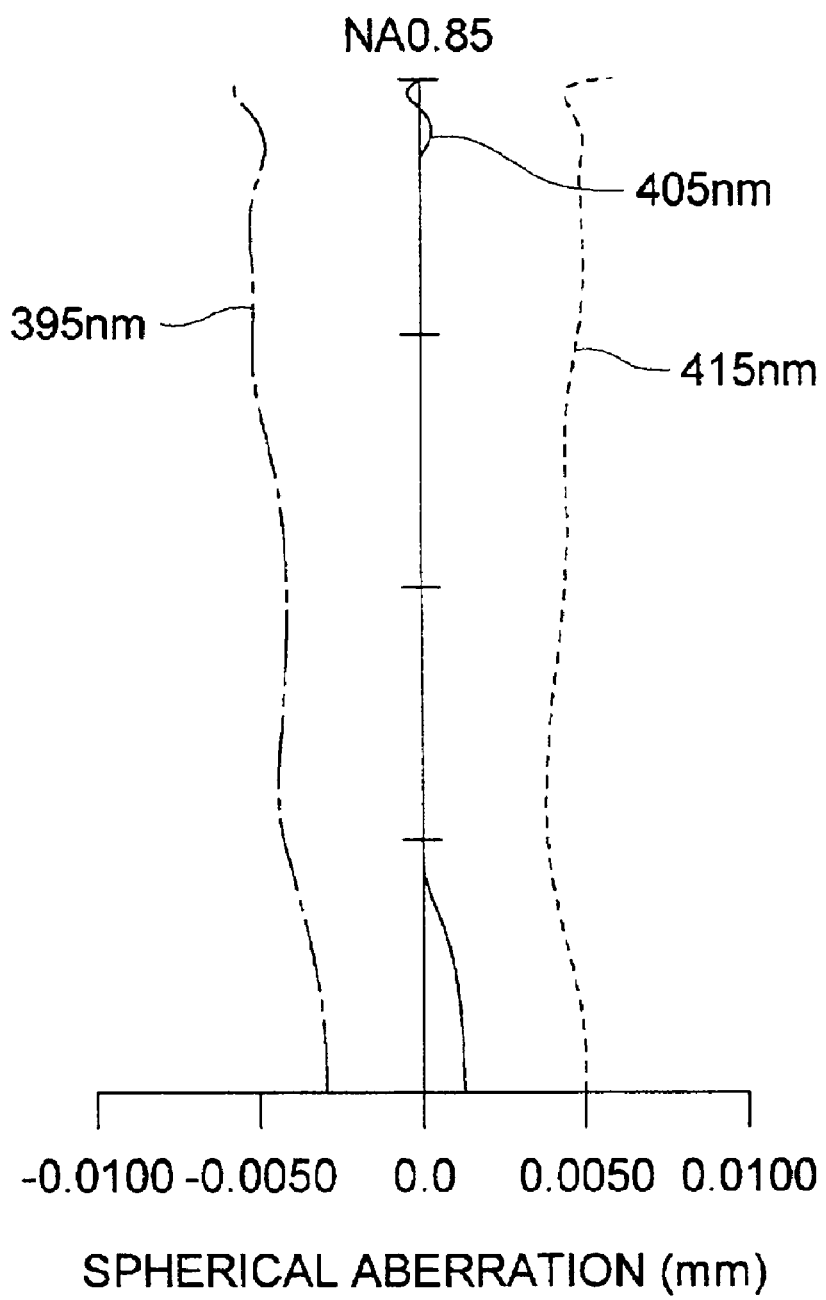
FIG. 9 is a spherical aberration view of Example 2.
Figure 10:
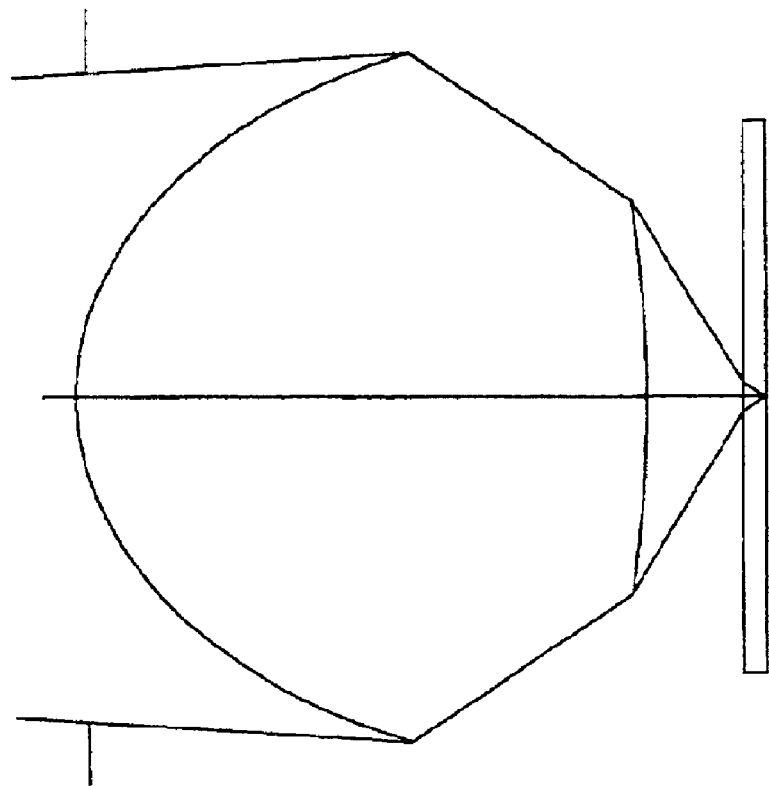
FIG. 10 is an optical path view of Example 3.
Figure 11:
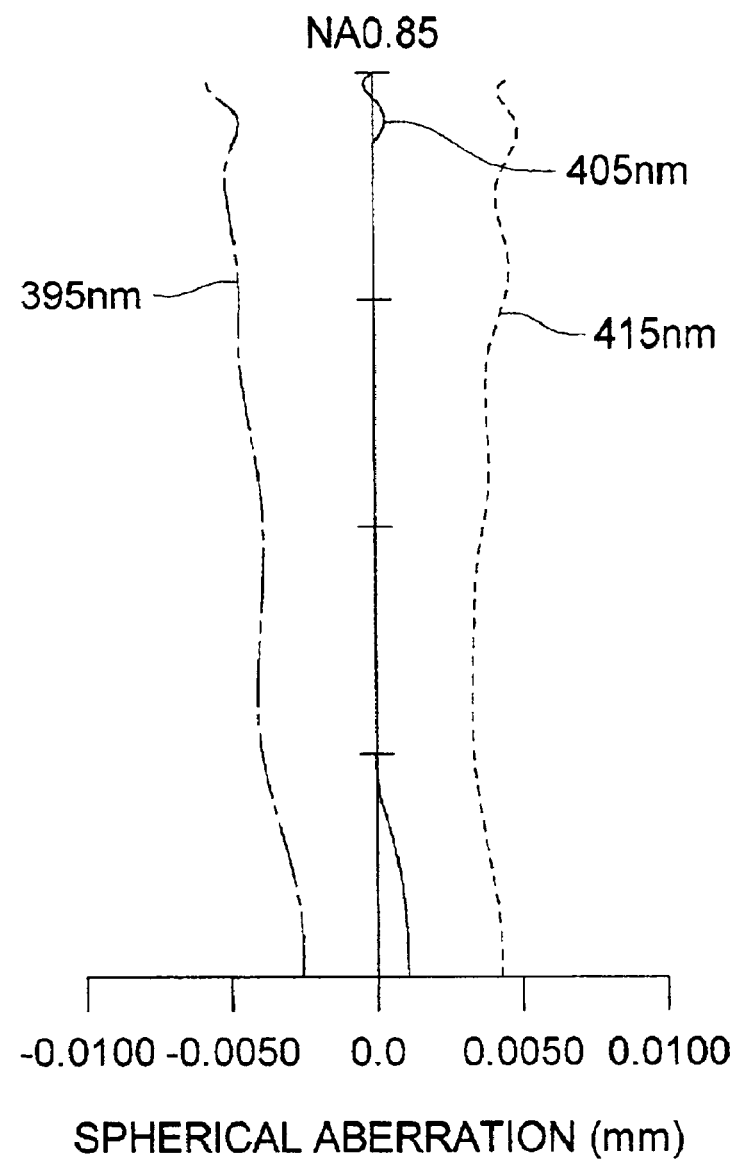
FIG. 11 is a spherical aberration view of Example 3.
Figure 12:
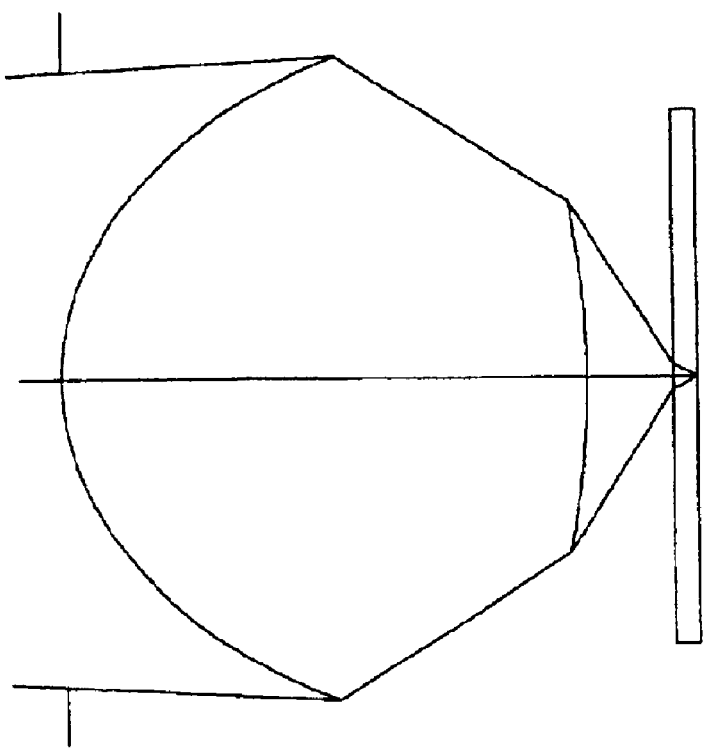
FIG. 12 is an optical path view of Example 4.
Figure 13:
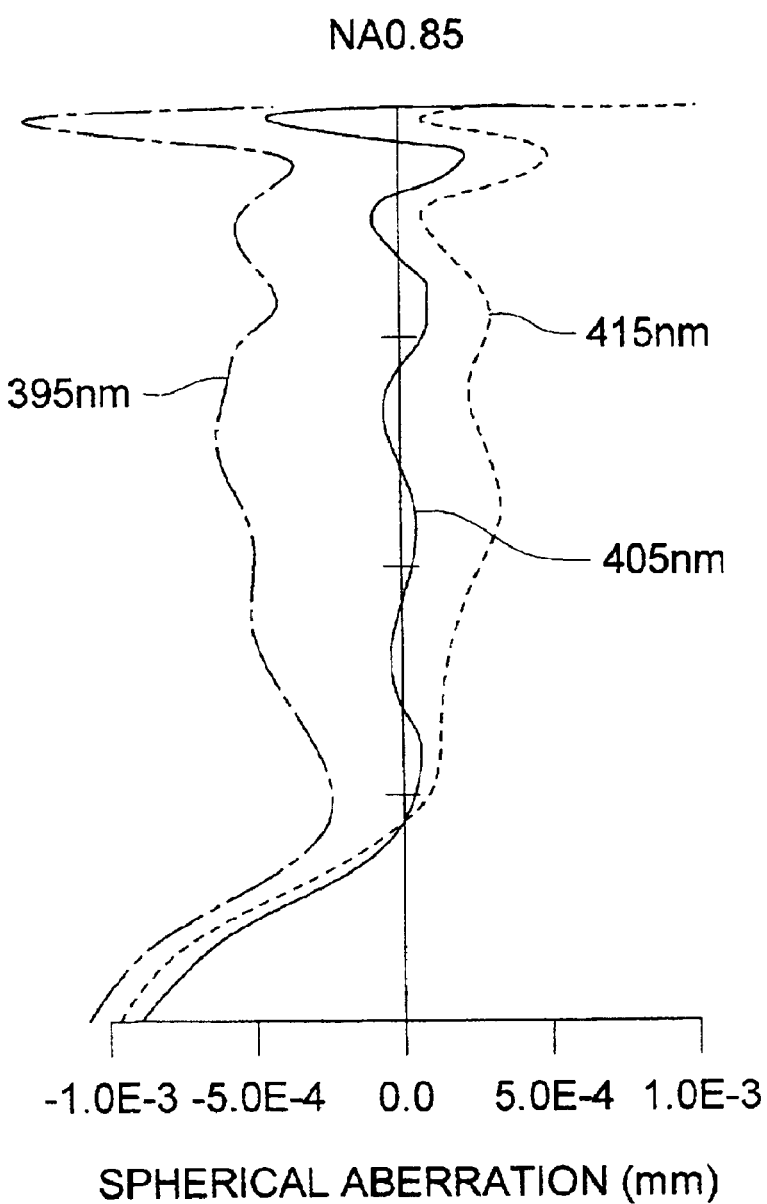
FIG. 13 is a spherical aberration view of Example 4.
Figure 14:
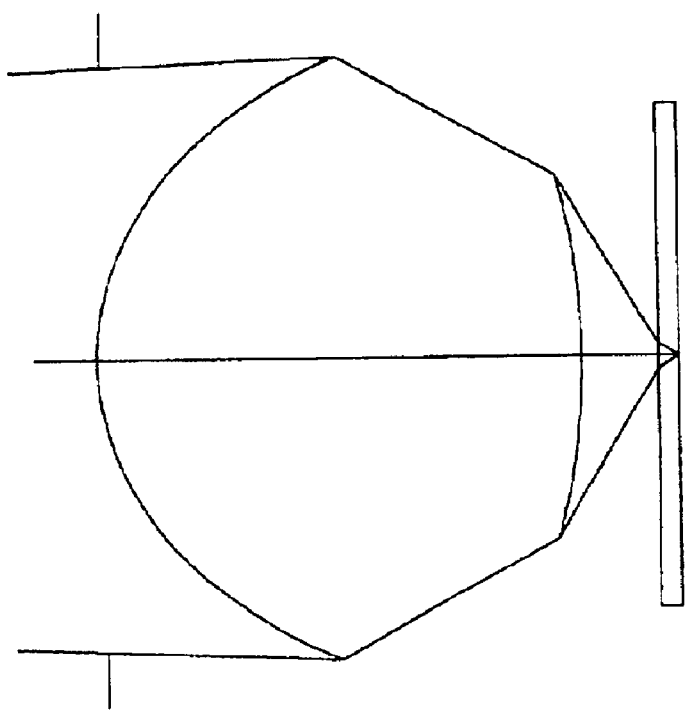
FIG. 14 is an optical path view of Example 5.
Figure 15:
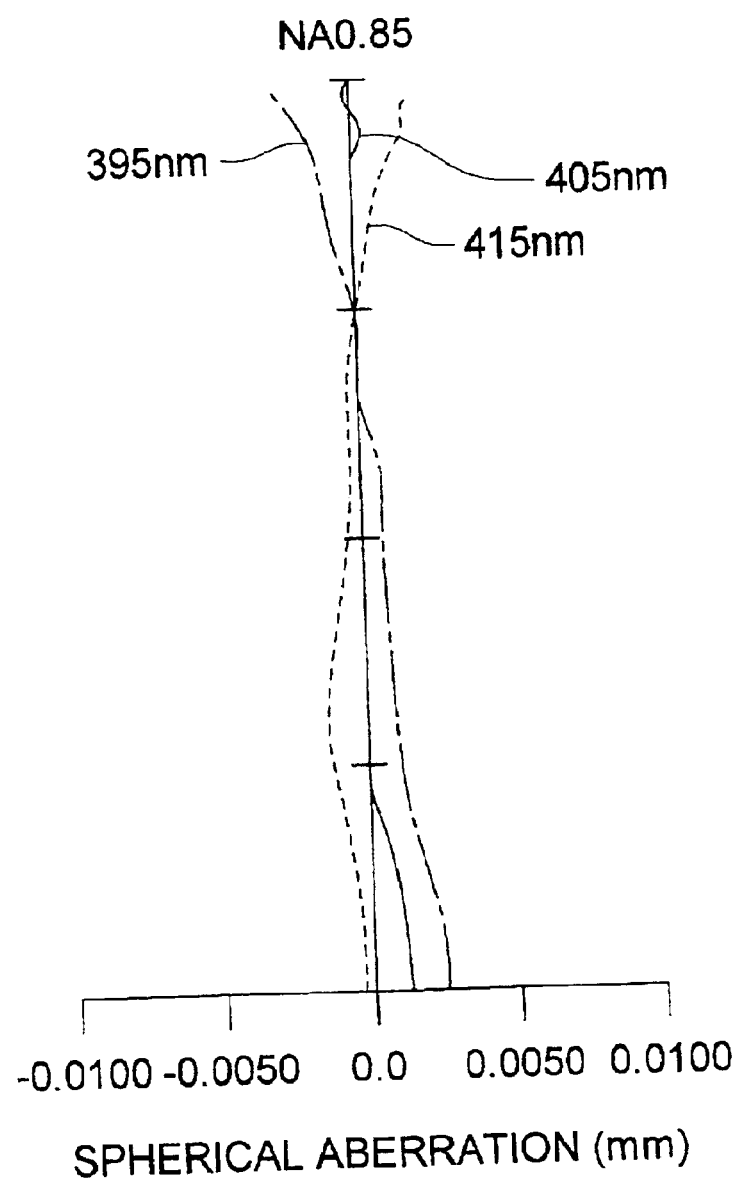
FIG. 15 is a spherical aberration view of Example 5.

FIG. 5 is a view generally showing the optical pickup apparatus according to the fifth embodiment of the present invention.

Because the optical pickup apparatus shown in FIG. 5 is basically the same structure as in FIG. 1, except that, instead of the refractive index distribution variable element, the lens is displaceable in the optical axis direction for the correction of the spherical aberration variation by the one axis actuator 13, and a collimator lens 15 is arranged between the light source 1 and the polarized beam splitter 2, and the light converging lens 14 is arranged between the polarized beam splitter 2 and the light detector 12, the same portion is denoted by the same reference numeral and sign, and its explanation is neglected.

As shown in FIG. 5, when the variation of the spherical aberration is detected by the light detector 12, the lens 33 is displaced in the optical axis direction by the one axis actuator 13 so that the spherical aberration is zero, and the divergent angle of the parallel light is changed, and the variation of the spherical aberration is corrected. According to the optical pickup apparatus in FIG. 5, the same effect as that in FIG. 1 can be obtained. Further, when the lens 23 is structured so as to be movable, by the simple structure, the variation of the spherical aberration can be finely corrected.

EXAMPLES

Next, examples 1–11 according to the present invention will be described. Examples 1–6 are examples of the objective lens, and these can be used as the objective lens in FIG. 1–FIG. 5, and examples 7–9 are examples of the light converging optical system by which the spherical aberration variation correction can be conducted.

A table of the data relating to the objective lens of examples 1–6 is shown in Table 1.

TABLE 1

Table of examples

| | Example | | | | | |
|---|---|---|---|---|---|---|
| | 1 | 2 | 3 | 4 | 5 | 6 |
| λ(nm) | 405 | 405 | 405 | 405 | 405 | 405 |
| image side numerical aperture | 0.85 | 0.85 | 0.85 | 0.85 | 0.85 | 0.85 |
| object side numerical aperture | 0.04 | 0.08 | 0.05 | 0.05 | 0.04 | 0.05 |
| f (mm) | 1.76 | 1.76 | 1.76 | 1.76 | 1.76 | 1.76 |
| the first surface effective diameter (mm) (note 1) | 3.174 | 3.370 | 3.160 | 3.146 | 3.128 | 3.160 |
| WD (mm) | 0.50 | 0.52 | 0.43 | 0.40 | 0.42 | 0.43 |
| lens material | glass | glass | plastic | plastic | plastic | plastic |
| refractive index in the using wavelength | 1.71548 | 1.71548 | 1.52491 | 1.52491 | 1.52491 | 1.52491 |
| \|m\| | 0.05 | 0.09 | 0.06 | 0.06 | 0.04 | 0.06 |
| d/f | 1.41 | 1.47 | 1.51 | 1.51 | 1.44 | 1.51 |
| r1/((n − 1) · f · √(1+\|m\|)) | 1.10 | 1.08 | 1.24 | 1.32 | 1.37 | 1.24 |
| X1 | 1.055 | 1.239 | 1.508 | 1.339 | 1.244 | 1.508 |
| X2 | −0.058 | −0.034 | −0.085 | −0.075 | −0.122 | −0.085 |
| (X1 − X2) * (n − 1)/(NA · f · √(1+\|m\|)) | 0.52 | 0.58 | 0.54 | 0.48 | 0.47 | 0.54 |
| PD/PT | — | — | — | 0.07 | 0.10 | — |
| f · λ · Σ(ni/(Mi · Pi²)) | — | — | — | 0.49 | 0.19 | — |
| \|(Ph/Pf) − 2\| | — | — | — | 2.3 | 0.1 | — |
| ΔCA (μm) | — | — | — | 0.000 | −0.060 | — |
| ΔCA/ΔSA | — | — | — | 0.00 | −0.39 | — |
| (Where, Δλ = +10 nm) minimum value (μm) of the ring pair interval in the effective area (note 2) | — | — | — | 3.0 | 4.8 | — |

(note 1) the surface on the light source side of the objective lens is the first surface
(note 2) the case of the use of the first order diffracted light The diffractive surface provided in each example is expressed by the optical path difference function Φb according to the above expression (A). Further, the aspherical surface in each example is expressed by the following expression (B) wherein the optical axis direction is x axis, and the height in the direction perpendicular to the optical axis is h.

$$x=(h^2/r)/\{1+\sqrt{1-(1+\kappa)(h^2/r^2)}\}+A_4h^4+A_6h^6+.$$

Where, $A_4, A_6, \ldots$ : aspherical surface coefficient, κ:conical coefficient, r:paraxial radius of curvature, r, d, n:radius of curvature of lens, surface interval, and refractive index.

Examples 1–6

Each lens data of the objective lens of examples 1–6 is respectively shown in the following Table 2–Table 7. Further, the optical path views relating to examples 1–5 are respectively shown in FIG. 6, FIG. 8, FIG. 10, FIG. 12, FIG. 14, and the spherical aberration views relating to examples 1–6 are respectively shown in FIG. 7, FIG. 9, FIG. 11, FIG. 13, FIG. 15 and FIG. 17.

TABLE 2

Example 1

| Surface No. | | r (mm) | d (mm) | Nλ | vd |
|---|---|---|---|---|---|
| 0 | light source | | 40.000 | | |
| 1 | objective | 1.426 | 2.480 | 1.71548 | 53.3 |
| 2 | lens | −3.023 | 0.503 | | |
| 3 | transparent | ∞ | 0.100 | 1.61949 | 30.0 |
| 4 | substrate | ∞ | | | |

Aspherical surface coefficient

| The 1st surface | κ | −7.3116E−01 |
|---|---|---|
| | A4 | 1.0487E−02 |
| | A6 | −2.3650E−04 |
| | A8 | 2.0969E−03 |
| | A10 | −7.7329E−05 |
| | A12 | −4.1781E−04 |
| | A14 | 5.5087E−05 |
| | A16 | 7.9179E−05 |
| | A18 | −2.0997E−05 |
| | A20 | −3.0601E−06 |
| The 2nd surface | κ | 2.1537E−01 |
| | A4 | 3.9352E−01 |
| | A6 | −5.2398E−01 |
| | A8 | 3.1159E−01 |
| | A10 | −6.8655E−02 |
| | A12 | −3.0029E−03 |

TABLE 3

Example 2

| Surface No. | | r (mm) | d (mm) | Nλ | vd |
|---|---|---|---|---|---|
| 0 | light source | | 20.000 | | |
| 1 | objective | 1.431 | 2.600 | 1.71548 | 53.3 |
| 2 | lens | −2.602 | 0.528 | | |
| 3 | transparent | ∞ | 0.100 | 1.61949 | 30.0 |
| 4 | substrate | ∞ | | | |

Aspherical surface coefficient

| The 1st surface | κ | −7.4278E−01 |
|---|---|---|
| | A4 | 9.0890E−03 |
| | A6 | −3.1206E−04 |
| | A8 | 2.1118E−03 |
| | A10 | 1.1383E−04 |
| | A12 | −3.9386E−04 |
| | A14 | 3.9377E−05 |
| | A16 | 6.9426E−05 |
| | A18 | −2.1052E−05 |
| | A20 | 5.9579E−07 |
| The 2nd surface | κ | −6.2880E+00 |
| | A4 | 4.2326E−01 |
| | A6 | −5.0806E−01 |
| | A8 | 2.7672E−01 |
| | A10 | −6.4984E−02 |
| | A12 | 2.7642E−03 |

TABLE 4

Example 3

| Surface No. | | r (mm) | d (mm) | Nλ | vd |
|---|---|---|---|---|---|
| 0 | light source | | 30.000 | | |
| 1 | objective | 1.179 | 2.670 | 1.52491 | 56.5 |

TABLE 4-continued

Example 3

| | | | | | |
|---|---|---|---|---|---|
| 2 | lens | −0.953 | 0.431 | | |
| 3 | transparent | ∞ | 0.100 | 1.61949 | 30.0 |
| 4 | substrate | ∞ | | | |

Aspherical surface coefficient

| The 1st surface | κ | −6.8964E−01 |
|---|---|---|
| | A4 | 1.5539E−02 |
| | A6 | −1.7675E−03 |
| | A8 | 4.4843E−03 |
| | A10 | −6.4011E−06 |
| | A12 | −5.3825E−04 |
| | A14 | 7.4370E−05 |
| | A16 | 1.2625E−04 |
| | A18 | −1.4841E−05 |
| | A20 | −5.8487E−06 |
| The 2nd surface | κ | −1.8291E+01 |
| | A4 | 3.8465E−01 |
| | A6 | −5.5915E−01 |
| | A8 | 3.9140E−01 |
| | A10 | −1.2809E−01 |
| | A12 | 1.4047E−02 |

TABLE 5

Example 4

| Surface No. | | r (mm) | d (mm) | Nλ | vd |
|---|---|---|---|---|---|
| 0 | light source | | 30.000 | | |
| 1 | objective | 1.257 | 2.670 | 1.52491 | 56.5 |
| 2 | lens | −0.956 | 0.400 | | |
| 3 | transparent | ∞ | 0.100 | 1.61949 | 30.0 |
| 4 | substrate | ∞ | | | |

Aspherical surface coefficient

| The 1st surface | κ | −6.6457E−01 |
|---|---|---|
| | A4 | 2.6471E−02 |
| | A6 | −7.4602E−03 |
| | A8 | 5.0088E−03 |
| | A10 | −6.1707E−06 |
| | A12 | −6.6424E−04 |
| | A14 | 1.8494E−05 |
| | A16 | 1.4294E−04 |
| | A18 | −8.2918E−06 |
| | A20 | −1.0820E−05 |
| The 2nd surface | κ | −3.9759E+01 |
| | A4 | 2.8547E−01 |
| | A6 | −5.4154E−01 |
| | A8 | 4.4957E−01 |
| | A10 | −1.6411E−01 |
| | A12 | 1.4047E−02 |

Diffractive surface coefficient

| The 1st surface | b2 | −1.9000E−02 |
|---|---|---|
| | b4 | 1.2375E−03 |
| | b6 | −1.6061E−03 |

TABLE 6

Example 5

| Surface No. | | r (mm) | d (mm) | Nλ | vd |
|---|---|---|---|---|---|
| 0 | light source | | 40.000 | | |
| 1 | objective | 1.289 | 2.550 | 1.52491 | 56.5 |
| 2 | lens | −1.139 | 0.419 | | |

TABLE 6-continued

Example 5

| | | | | | |
|---|---|---|---|---|---|
| 3 | transparent | ∞ | 0.100 | 1.61949 | 30.0 |
| 4 | substrate | ∞ | | | |

Aspherical surface coefficient

| | | |
|---|---|---|
| The 1st surface | κ | −6.8906E−01 |
| | A4 | 1.5612E−02 |
| | A6 | −8.5241E−04 |
| | A8 | 3.5255E−03 |
| | A10 | −1.5535E−05 |
| | A12 | −5.5211E−04 |
| | A14 | 2.4923E−05 |
| | A16 | 1.4698E−04 |
| | A18 | −1.6428E−05 |
| | A20 | −1.1232E−05 |
| The 2nd surface | κ | −1.6540E+01 |
| | A4 | 2.7871E−01 |
| | A6 | −4.4625E−01 |
| | A8 | 3.3462E−01 |
| | A10 | −1.2881E−01 |
| | A12 | 1.9140E−02 |
| | A14 | 1.03398E−04 |

Diffractive surface coefficient

| | | |
|---|---|---|
| The 1st surface | b2 | −2.7000E−02 |

TABLE 7

Example 6

| Surface No. | | r (mm) | d (mm) | Nλ | vd |
|---|---|---|---|---|---|
| 0 | light source | | 30.000 | | |
| 1 | objective | 1.179 | 2.670 | 1.52491 | 56.5 |
| 2 | lens | −0.953 | 0.431 | | |
| 3 | transparent | ∞ | 0.100 | 1.61949 | 30.0 |
| 4 | substrate | ∞ | | | |

Aspherical surface coefficient

0 ≤ h ≤ 1.58
(where, h: the lens surface height from the optical axis)

| | | |
|---|---|---|
| The 1st surface | κ | −6.8964E−01 |
| | A4 | 1.5539E−02 |
| | A6 | −1.7675E−03 |
| | A8 | 4.4843E−03 |
| | A10 | −6.4011E−06 |
| | A12 | −5.3825E−04 |
| | A14 | 7.4370E−05 |
| | A16 | 1.2625E−04 |
| | A18 | −1.4841E−05 |
| | A20 | −5.8487E−06 | h > 1.58
(where, h: the lens surface height from the optical axis)

| | | |
|---|---|---|
| The 1st surface | κ | −6.8964E−01 |
| | A4 | 1.5539E−02 |
| | A6 | −1.7675E−03 |
| | A8 | 4.4843E−03 |
| | A10 | −6.4011E−06 |
| | A12 | −5.3825E−04 |
| | A14 | 7.4370E−05 |
| | A16 | 1.2625E−04 |
| | A18 | −1.4841E−05 |
| | A20 | −1.0000E−06 |
| The 2nd surface | κ | −1.8291E+01 |
| | A4 | 3.8465E−01 |
| | A6 | −5.5954E−01 |
| | A8 | 3.9140E−01 |

TABLE 7-continued

Example 6

| | | |
|---|---|---|
| | A10 | −1.2809E−01 |
| | A12 | 1.4047E−02 |

Examples 1–6 are the objective lens of 1 group 1 element composition in which the using wavelength is 405 nm, and the image side numerical aperture is 0.85, and when it is made the finite conjugation type, the working distance is largely assured in such a manner that it is more than 0.40 mm.

In each of objective lenses in examples 1 and 2, when it is formed of the optical glass material (made by HOYA Co.: LaCl3) in which the refractive index in the using wavelength is more than 1.7 and comparatively high, even when it is the finite conjugation type, the radius of curvature of the surface on the light source side is not too small, and further, the prospect angle of the surface on the light source side is made not too large.

Further, because each of objective lenses of examples 3, 4, 5 and 6 is formed of the optical plastic material, the mass production can be possible in low cost. In each of objective lenses of examples 4 and 5, when the surface on the light source side is a diffractive surface, the longitudinal chromatic aberration generated in the objective lens is corrected. Particularly, in the objective lens of the example 5, when the longitudinal chromatic aberration is overly corrected, and the above expression (10) is satisfied, even though the objective lens in which the wave front aberration deterioration at the time of the mode hop of the light source is small, the minimum value of the ring-shaped diffractive zone interval can be larger than the objective lens of the example 4 in which both of the longitudinal chromatic aberration and the spherical aberration of the color are corrected.

In this connection, the change amount ΔCA of the longitudinal chromatic aberration in the expression (10)is shown by the movement width of the lower edge of the spherical aberration curve of 405 nm and 415 nm in the spherical aberration view (FIG. 15) of the objective lens of the example 5 when the wavelength of the light source is shifted by +10 nm toward the long wavelength side, and the movement direction is a direction in which the back focus becomes short by the shift toward the long wavelength side of the wavelength of the light source. Further, the change amount ΔSA of the spherical aberration of the marginal ray of light is shown by the width between the upper edge of the spherical aberration curve, and the upper edge of the spherical aberration curve of 415 nm, when the spherical aberration curve of 405 nm is parallely moved to the position at which its lower edge is superimposed on the lower edge of the spherical aberration curve of 415 nm.

Figure 16:
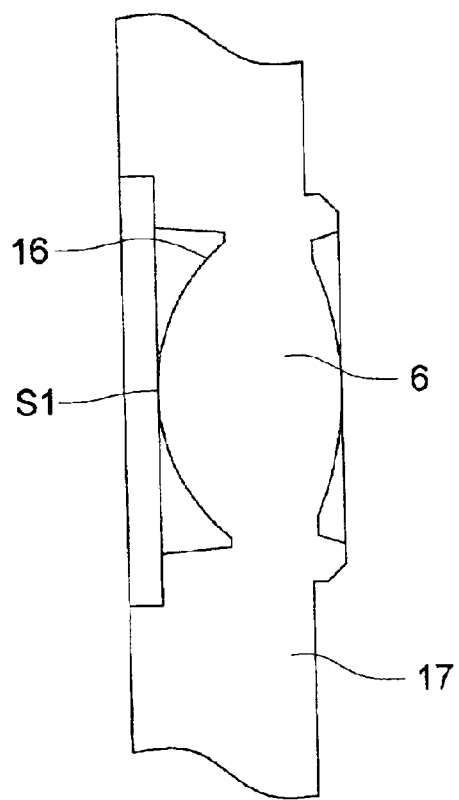
FIG. 16($a$) is a sectional view of an objective lens of Example 6, and FIG. 16($b$) is a view enlargedly showing the step difference of the objective lens.
Figure 16:
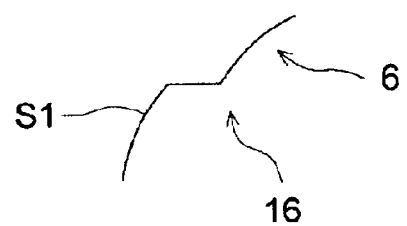
Figure 17:
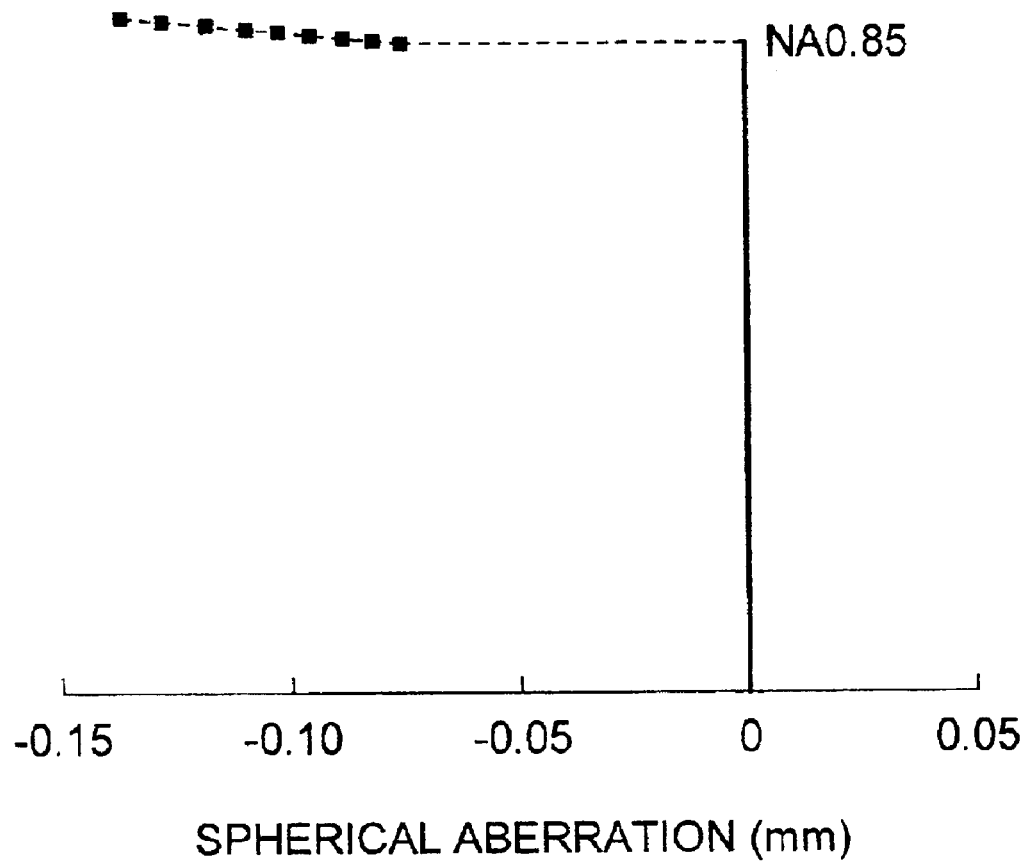
FIG. 17 is a spherical aberration view of Example 6.

The objective lens of the example 6 is integrally formed with the bobbin portion 17 as shown in the sectional view of FIG. 16(a), and in the objective lens of the example 3, a step difference 16 to regulate the luminous flux at the position of the height 1.58 mm (corresponding to the image side numerical aperture 0.85) from the optical axis on the surface S1 on the light source side, is formed as shown in FIG. 16(b).

In the objective lens of the example 6, when h is the height from the optical axis, the function expressing the shape of the surface on the light source side from the step difference 16, is f(h), and the shape of the surface of the outside from the step difference 16 g(h), because the shape of g(h)is determined so that the differential function of them f'(h) and g'(h) satisfy f'(h)≠g'(h), the luminous flux passing the surface outside from the step difference 16 is light converged onto the position nearer the light source than the luminous flux passing the surface on the optical axis side from the step difference 16.

Examples 7–9

Figure 18:
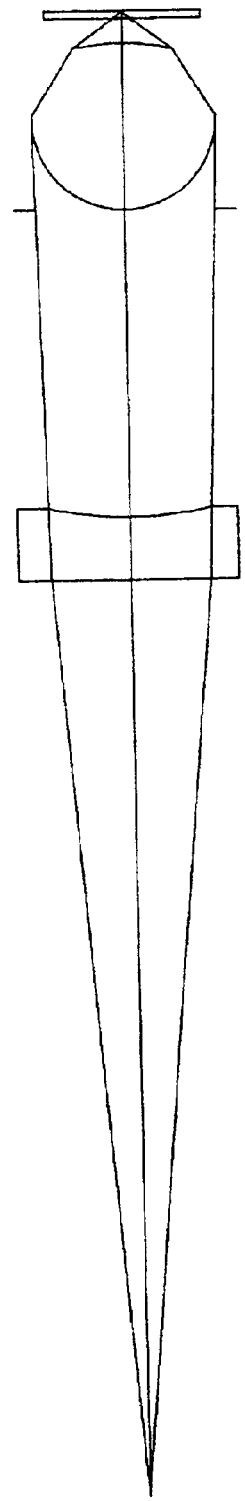
FIG. 18 is an optical path view of Example 7.
Figure 19:
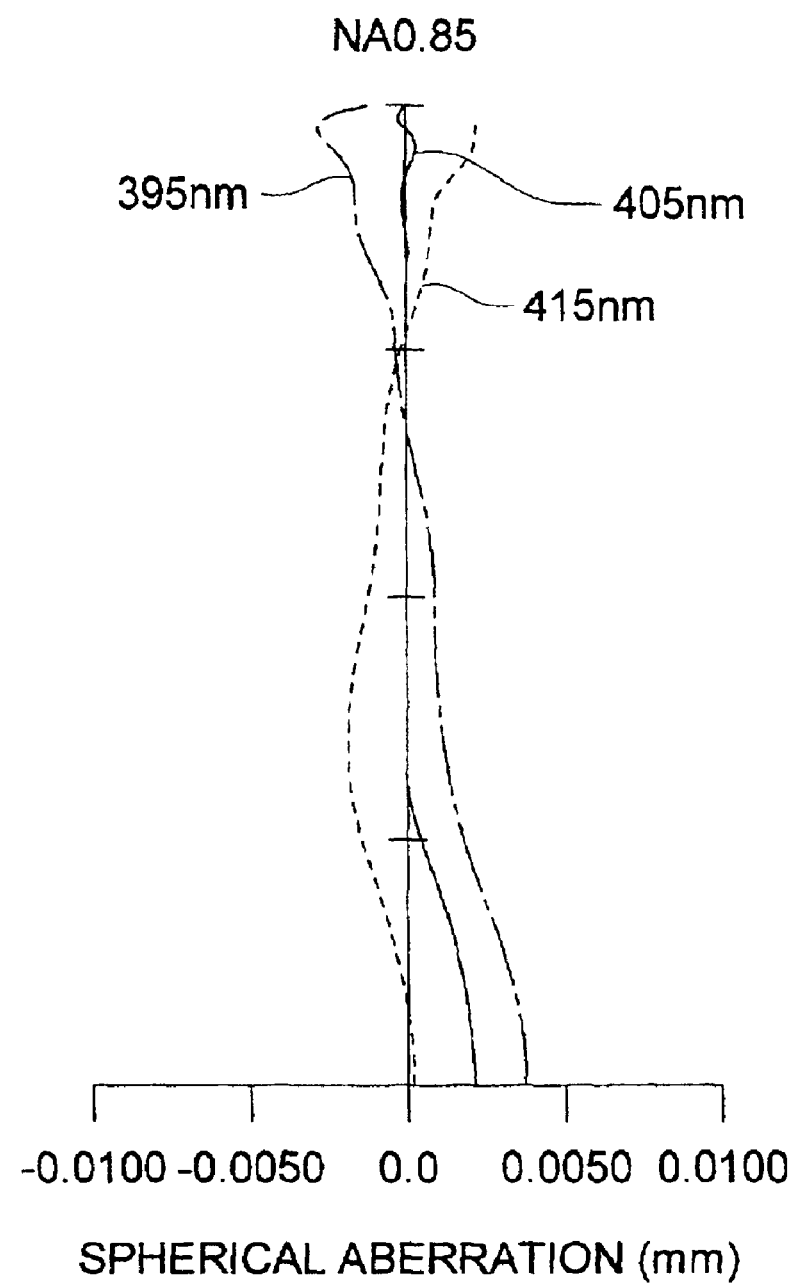
FIG. 19 is a spherical aberration view of Example 7.
Figure 20:
FIG. 20 is an optical path view of Example 8.
Figure 21:
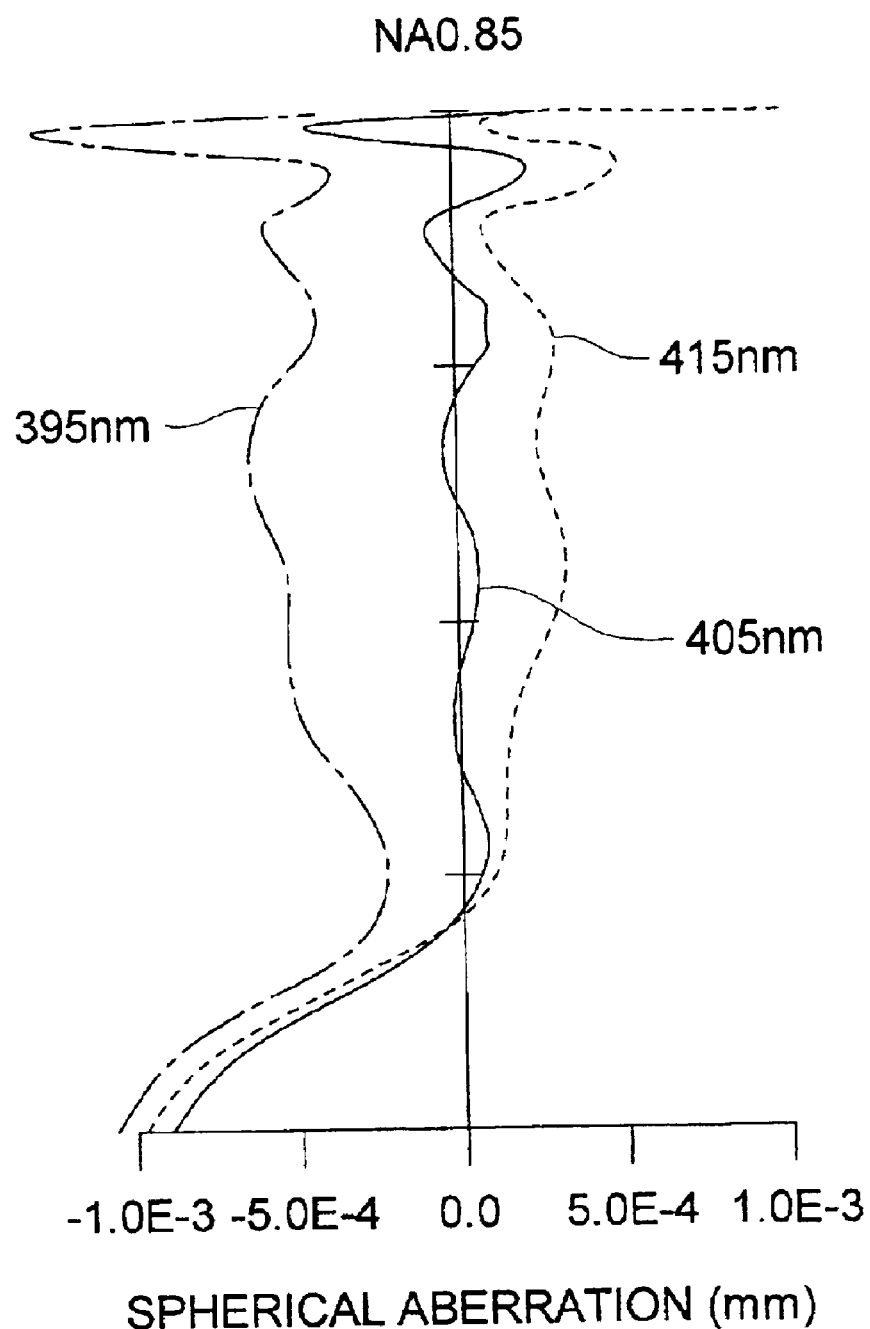
FIG. 21 is a spherical aberration view of Example 8.
Figure 22:
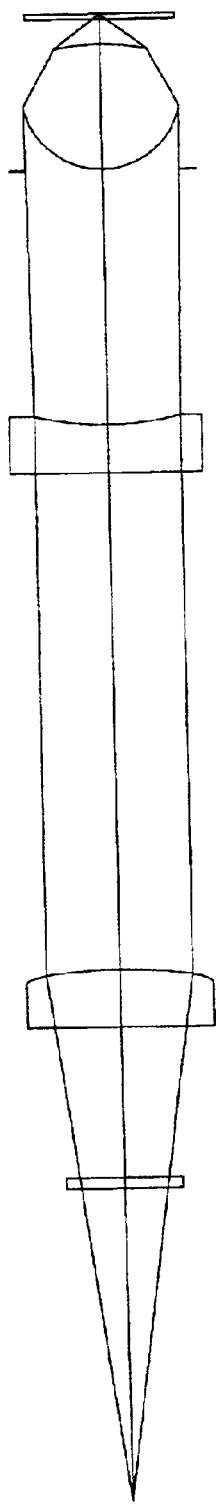
FIG. 22 is an optical path view of Example 9.
Figure 23:
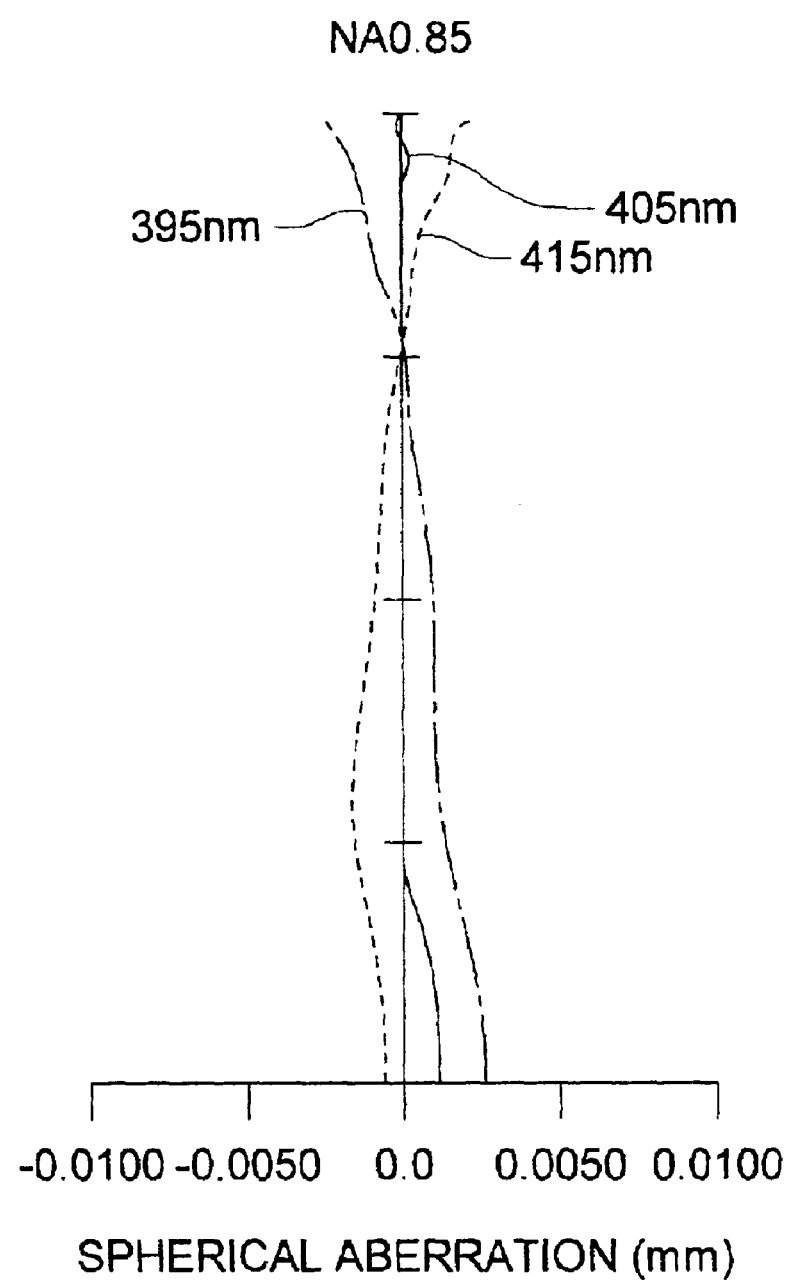
FIG. 23 is a spherical aberration view of Example 9.

Each lens data of examples 7–9 is respectively shown in the following Table 8–Table 10. Further, the optical path views relating to the example 7–9 are respectively shown in FIG. 18, FIG. 20, and FIG. 22, and the spherical aberration views relating to the examples 7–9 are respectively shown in FIG. 19, FIG. 21 and FIG. 23.

TABLE 8

Example 7

| Surface No. | | r (mm) | d (mm) | Nλ | νd |
|---|---|---|---|---|---|
| 0 | light source | | d0 (variable) | | |
| 1 | spherical aberration | ∞ | 1.000 | 1.52491 | 56.5 |
| 2 | correction means | 12.847 | d2 (variable) | | |
| 3 | objective | 1.179 | 2.670 | 1.52491 | 56.5 |
| 4 | lens | −0.953 | 0.400 | | |
| 5 | transparent | ∞ | 0.100 | 1.61949 | 30.0 |
| 6 | substrate | ∞ | | | |

| Aspherical surface coefficient | | | |
|---|---|---|---|
| The 2nd surface | κ | | 2.8960E+00 |
| | A4 | | −3.9039E−04 |
| | A6 | | 1.0133E−03 |
| | A8 | | −3.4759E−04 |
| The 3rd surface | κ | | −6.8964E−01 |
| | A4 | | 1.5539E−02 |
| | A6 | | −1.7675E−03 |
| | A8 | | 4.4843E−03 |
| | A10 | | −6.4011E−06 |
| | A12 | | −5.3825E−04 |
| | A14 | | 7.4370E−05 |
| | A16 | | 1.2625E−04 |
| | A18 | | −1.4841E−05 |
| | A20 | | −5.8487E−06 |
| The 4th surface | κ | | −1.7102E+01 |
| | A4 | | 3.6895E−01 |
| | A6 | | −5.2335E−01 |
| | A8 | | 3.4550E−01 |
| | A10 | | −9.0062E−02 |
| | A12 | | 3.9543E−06 |

| Diffractive surface coefficient | | | |
|---|---|---|---|
| The 1st surface | b2 | | −2.0000E−02 |
| The 2nd surface | b2 | | −2.0000E−02 |

TABLE 9

Example 8

| Surface No. | | r (mm) | d (mm) | Nλ | νd |
|---|---|---|---|---|---|
| 0 | light source | | d0 (variable) | | |
| 1 | objective | 1.257 | 2.670 | 1.52491 | 56.5 |
| 2 | lens | −0.956 | 0.400 | | |
| 3 | transparent | ∞ | 0.100 | 1.61949 | 30.0 |
| 4 | substrate | ∞ | | | |

TABLE 9-continued

Example 8

| Aspherical surface coefficient | | | |
|---|---|---|---|
| The 1st surface | κ | | −6.6457E−01 |
| | A4 | | 2.6471E−02 |
| | A6 | | −7.4602E−03 |
| | A8 | | 5.0088E−03 |
| | A10 | | −6.1707E−06 |
| | A12 | | −6.6424E−04 |
| | A14 | | 1.8494E−05 |
| | A16 | | 1.4294E−04 |
| | A18 | | −8.2918E−06 |
| | A20 | | −1.0820E−05 |
| The 2nd surface | κ | | −3.9759E+01 |
| | A4 | | 2.8547E−01 |
| | A6 | | −5.4154E−01 |
| | A8 | | 4.4957E−01 |
| | A10 | | −1.6411E−01 |
| | A12 | | 1.4047E−02 |

| Diffractive surface coefficient | | | |
|---|---|---|---|
| The 1st surface | b2 | | −1.9000E−02 |
| | b4 | | 1.2375E−03 |
| | b6 | | −1.6061E−03 |

TABLE 10

Example 9

| Surface No. | | r (mm) | d (mm) | Nλ | νd |
|---|---|---|---|---|---|
| 0 | light source | | 6.050 | | |
| 1 | transparent | ∞ | 0.250 | 1.53020 | |
| 2 | substrate | ∞ | 3.000 | | |
| 3 | collimator | ∞ | 1.200 | 1.52491 | 56.5 |
| 4 | lens | −5.832 | d4 (variable) | | |
| 5 | spherical aberration | ∞ | 1.000 | 1.52491 | 56.5 |
| 6 | correction means | 18.369 | d6 (variable) | | |
| 7 | objective | 1.289 | 2.550 | 1.52491 | 56.5 |
| 8 | lens | −1.139 | 0.419 | | |
| 9 | transparent | ∞ | 0.100 | 1.61949 | 30.0 |
| 10 | substrate | ∞ | | | |

| Aspherical surface coefficient | | | |
|---|---|---|---|
| The 4th surface | κ | | −9.6468E−01 |
| | A4 | | −1.3857E−04 |
| | A6 | | −2.5732E−05 |
| The 6th surface | κ | | −1.5927E+00 |
| | A4 | | −3.0945E−04 |
| | A6 | | 4.7432E−05 |
| The 7th surface | κ | | −6.8906E−01 |
| | A4 | | 1.5612E−02 |
| | A6 | | −8.5241E−04 |
| | A8 | | 3.5255E−03 |
| | A10 | | −1.5535E−05 |
| | A12 | | −5.5211E−04 |
| | A14 | | 2.4923E−05 |
| | A16 | | 1.4698E−04 |
| | A18 | | −1.6428E−05 |
| | A20 | | −1.1232E−05 |
| The 8th surface | κ | | −1.6540E+01 |
| | A4 | | 2.7871E−01 |
| | A6 | | −4.4625E−01 |
| | A8 | | 3.3462E−01 |
| | A10 | | −1.2881E−01 |
| | A12 | | 1.9140E−02 |
| | A14 | | 1.0340E−04 |

TABLE 10-continued

Example 9

Diffractive surface coefficient

| | | |
|---|---|---|
| The 4th surface | b2 | −5.0000E−03 |
| | b4 | 7.7926E−05 |
| | b6 | −1.2856E−05 |
| The 7th surface | b2 | −2.7000E−02 |

The examples 7–9 are the light converging optical system having the objective lens of the finite conjugation type of 1 group 1 element composition and a correction means for correcting the variation of the spherical aberration, and respectively the using wavelength is 405 nm, and the image side numerical aperture of the objective lens is 0.85.

In the light converging optical system of the example 7, as shown in FIG. 3, when the coupling lens which is arranged between the light source and the objective lens and by which the divergence degree of the divergent luminous flux is changed, is displaced along the optical axis, the variation of the spherical aberration is corrected. Because the coupling lens is formed of the light weight optical plastic, the lightening of the burden onto the actuator, or the high speed response to the variation of the spherical aberration is possible. Further, when the coupling lens is formed of a both surface diffractive lens, the longitudinal chromatic aberration of the light converging optical system total system is corrected.

Further, in the light converging optical system of the example 8, in the objective lens of the example 4, as shown in FIG. 4, when the light source is displaced along the optical axis, the variation of the spherical aberration is corrected.

Further, in the light converging optical system of the example 9, as shown in FIG. 5, when the lens arranged between the collimator lens and the objective lens of the example 5 is displaced along the optical axis, the variation of the spherical aberration is corrected. In this case, because the emitted light from the collimator lens is parallel luminous flux, the optical element such as the polarized beam splitter, beam shaping element, or wavelength plate, can be easily arranged in this parallel luminous flux. Further, when the collimator lens is formed of the diffractive lens, even when the wavelength variation of the light source or temperature and humidity change is generated, the emitted light from the collimator lens is made almost parallel luminous flux. Further, because the lens which is displaceable along the optical axis is formed of a light weight optical plastic material, the lightening of the burden onto the actuator or the high speed response to the variation of the spherical aberration is possible.

In this connection, because all of the lenses included in the light converging optical systems of examples 7–9 are formed of the optical plastic material, by the molding method using the metallic die, the mass production can be conducted in the low cost, and the light converging optical system which is totally light weight, can be obtained.

Further, in the light converging optical systems of example 7–9, the results in which the spherical aberration generated due to the oscillation wavelength variation of ±10 nm of the light source, environmental temperature change of ±30° C., or thickness error of the protective layer of ±0.02 mm is corrected, are shown in Tables 11–13, and in any case, it is finely corrected.

TABLE 11

Example 7

| Cause of spherical aberration variation | | Wave front aberration (before correction) | Wave front aberration (after correction) | d0 (variable) | d2 (variable) |
|---|---|---|---|---|---|
| Standard condition (λ = 405 nm, T = 25 ° C., t = 0.1 mm) | | 0.008 λ | 0.008 λ | 15.000 | 5.000 |
| Wavelength variation of the light source | Δλ = +10 nm | 0.150 λ | 0.010 λ | 14.103 | 5.897 |
| | Δλ = −10 nm | 0.169 λ | 0.011 λ | 16.076 | 3.924 |
| Temperature change | ΔT = +30° C. | 0.205 λ | 0.019 λ | 13.946 | 6.054 |
| | ΔT = −30° C. | 0.218 λ | 0.014 λ | 16.329 | 3.671 |
| Protective layer thickness error | Δt = +0.02 mm | 0.199 λ | 0.010 λ | 14.063 | 5.937 |
| | Δt = −0.02 mm | 0.202 λ | 0.010 λ | 15.887 | 4.113 |

(Note 1)
Change amount of refractive index of lens material at the time of temperature change: ΔN = −1.2 E−4/° C.
(Note 2)
Change amount of oscillation wavelength of light source at the time of temperature change: Δλ = +0.05 nm/° C.

TABLE 12

Example 8

| Cause of spherical aberration variation | | Wave front aberration (before correction) | Wave front aberration (after correction) | d0 (variable) |
|---|---|---|---|---|
| Standard condition (λ = 405 nm, T = 25° C., t = 0.1 mm) | | 0.006 λ | 0.006 λ | 30.000 |
| Wavelength variation of the light source | Δλ = +10 nm | 0.007 λ | 0.007 λ | 29.993 |
| | Δλ = −10 nm | 0.012 λ | 0.012 λ | 30.003 |

TABLE 12-continued

Example 8

| Cause of spherical aberration variation | | Wave front aberration (before correction) | Wave front aberration (after correction) | d0 (variable) |
|---|---|---|---|---|
| Temperature change | ΔT = +30° C. | 0.065 λ | 0.014 λ | 29.469 |
| | ΔT = −30° C. | 0.071 λ | 0.016 λ | 30.377 |
| Protective layer thickness error | Δt = +0.02 mm | 0.202 λ | 0.009 λ | 28.377 |
| | Δt = 0.02 mm | 0.202 λ | 0.014 λ | 31.844 |

(Note 1)
Change amount of refractive index of lens material at the time of temperature change: ΔN = −1.2 E-4/° C.
(Note 2)
Change amount of oscillation wavelength of light source at the time of temperature change: Δλ = +0.05 nm/° C.

TABLE 13

Example 9

| Cause of spherical aberration variation | | Wave front aberration (before correction) | Wave front aberration (after correction) | D4 (variable) | D6 (variable) |
|---|---|---|---|---|---|
| Standard condition (λ = 405 nm, T = 25° C., t = 0.1 mm) | | 0.005 λ | 0.005 λ | 10.000 | 5.000 |
| Wavelength variation of the light source | Δλ = +10 nm | 0.150 λ | 0.006 λ | 13.547 | 1.453 |
| | Δλ = −10 nm | 0.169 λ | 0.008 λ | 5.358 | 9.643 |
| Temperature change | ΔT = +30° C. | 0.205 λ | 0.014 λ | 14.383 | 0.617 |
| | ΔT = −30° C. | 0.218 λ | 0.016 λ | 3.131 | 11.869 |
| Protective layer thickness error | Δt = +0.02 mm | 0.199 λ | 0.010 λ | 14.389 | 0.611 |
| | Δt = −0.02 mm | 0.202 λ | 0.012 λ | 3.840 | 11.160 |

(Note 1)
Change amount of refractive index of lens material at the time of temperature change: ΔN = −1.2 E-4/° C.
(Note 2)
Change amount of oscillation wavelength of light source at the time of temperature change: Δλ = +0.05 nm/° C.

The light converging optical system of examples 7–9 can correct the generation of the spherical aberration due to the variation of the thickness of the protective layer over 0.02 mm. Accordingly, the recording and/or reproducing of the information onto the multi layer type optical information recording medium having a plurality of information recording layers form the same luminous flux incident surface side can be conducted.

In this connection, in the above each table or drawing, E (or e) is used for the expression of exponent of 10, and there is a case where it is expressed as, for example, E-02 (=10$^{-2}$).

Further, in the present specification, in the optical information recording medium, not only the medium having the protective layer on the luminous flux incident surface side, but also the medium having no protective layer, is included. When the optical information recording medium has the protective layer, in the objective lens used in the optical pickup apparatus of the present invention, it is preferable that the aberration correction is conducted so that aberration is minimum under the combination with some specific thickness protective layer.

Further, in the present specification, the minute variation of the oscillation wavelength of the light source is defined as, to the oscillation wavelength, the wavelength variation within the range of ±10 nm. Further, in the present specification, to (finely) correct each kind of aberration is preferable that, when the wave front aberration is found, it is not larger than so-called diffraction limit performance of 0.07 λ rms (herein, λ is the oscillation wavelength of the using light source), and considering the assembling accuracy of the optical pickup apparatus, it is more preferable that it is not larger than 0.05 λ rms.

Further, as the short wavelength light source in which it is preferable that it is used for the objective lens, light converging optical system, or optical pickup apparatus, other than the above blue violet semiconductor laser, there is a light source in which, before the semiconductor laser, a wavelength conversion element to convert the wavelength of the light from the semiconductor laser to a half, so called SHG (Second Harmonic Generation) element, is formed.

According to the present invention, even when it is a high NA objective lens, the objective lens for recording and/or reproducing of the information of the optical information recording medium in which the diameter is small and the working distance is large, can be provided.

Further, even an objective lens having the high NA, an objective lens for recording and/or reproducing of the information of the optical information recording medium in which the longitudinal chromatic aberration which becomes a problem when the small diameter, large working distance and a short wavelength light source is used, is corrected, can be provided.

Further, a light converging optical system for recording and/or reproducing of the information of the optical information recording medium, and a light converging optical system by which the variation of the spherical aberration generated in each optical surface of the light converging optical system due to the oscillation wavelength variation of the laser light source, temperature·humidity change, or the thickness error of the protective layer of the optical information recording medium, can be effectively corrected by the simple structure, can be provided. Further, a light converging optical system in which the longitudinal chromatic aberration which becomes a problem when the short wavelength light source is used, is corrected, can be provided.

Further, an optical pickup apparatus on which this objective lens and/or light converging optical system is mounted, and a recording and/or reproducing apparatus on which this optical pickup apparatus is mounted, can be provided.

What is claimed is:

1. An objective lens for use in an optical pickup apparatus for recording and/or reproducing information of an optical information recording medium, wherein the objective lens is a single lens comprising an aspherical surface on at least one surface;

wherein the objective lens is a finite conjugate type to converge a divergent light flux from a light source onto an information recording plane of the optical information recording medium and satisfies the following formula:

$$NA \geq 0.7$$

where NA is an image-side numerical aperture necessary for conducting recording and/or reproducing information of the optical information recording medium, and wherein the following formula is satisfied:

$$0.25 \leq (X1-X2)(n-1)/NA \cdot f \cdot \sqrt{(1+|m|)}) \leq 0.75,$$

where f is a focal length, where n is a refractive index of the objective lens for a used wavelength, where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture, where X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and where X1 takes a positive sign when it is measured in the direction toward the optical information recording medium from the tangent plane that serves as a reference point, and X1 takes a negative sign when it is measured in the direction toward the light source, and where X2 is a difference (mm) in the direction of the optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and where X2 takes a positive sign when it is measured in the direction toward the optical information recording medium from the tangent plane that serves as a reference point, and X2 takes a negative sign when it is measured in the direction toward the light source.

2. The objective lens of claim 1, wherein each of both surfaces of the objective lens is the aspherical surface.

3. The objective lens of claim 1, wherein the following formula is satisfied:

$$0.01 \leq |m| \leq 0.30$$

4. The objective lens of claim 1, wherein the following formula is satisfied:

$$0.8 \leq d/f \leq 2.4$$

where d is a thickness (mm) of the objective lens on an optical axis.

5. The objective lens of claim 1, wherein the following formula is satisfied:

$$0.8 < r1/((n-1) \cdot f \cdot \sqrt{(1+|m|)}) < 1.6$$

where r1 is a paraxial radius (mm) of curvature of the light source side surface of the objective lens.

6. An objective lens for use in an optical pickup apparatus for recording and/or reproducing information of an optical information recording medium, wherein the objective lens is a single lens comprising an aspherical surface on at least one surface;

wherein the objective lens is a finite conjugate type to converge a divergent light flux from a light source onto an information recording plane of the optical information recording medium, comprises a ring-shaped diffractive structure on at least one surface and satisfies the following formula:

$$NA \geq 0.7$$

where NA is an image-side numerical aperture necessary for conducting recording and/or reproducing information of the optical information recording medium.

7. The objective lens of claim 1 or 6, wherein a used wavelength is 600 nm or less and the objective lens is made of an optical material having an internal transmittance of 85% or more in the thickness of 3 mm for a used wavelength region of 600 nm or less.

8. The objective lens of claim 6, wherein when the light source generates a wavelength fluctuation within ±10 nm, the diffractive structure has a function to suppress a longitudinal chromatic aberration caused by a refractive index dispersion of the objective lens due to the wavelength fluctuation of the light source.

9. The objective lens of claim 6, wherein each of both surfaces of the objective lens is the aspherical surface.

10. The objective lens of claim 6, wherein the following formula is satisfied:

$$0.01 \leq PD/PT \leq 0.20$$

where PD is a power ($mm^{-1}$) of a diffractive structure defined by the formula of $PD=\Sigma(-2 \cdot b_{2i})$ when the diffractive structure formed on $i^{th}$ surface is represented by an optical path difference function defined by the formula of $\Phi b = b_{2i} h^2 + b_{4i} h^4 + b_{6i} h^6 + \ldots$ (here, h is a height (mm) from an optical axis and $b_{2i}, b_{4i}, b_{6i}, \ldots$ are 2nd order, $4^{th}$ order, $6^{th}$ order, ... optical path difference function coefficients respectively), and PT is a power ($mm^{-1}$) of the total system of the objective lens including a power as a refractive lens and a power of the diffractive structure.

11. The objective lens of claim 6, wherein the following formula is satisfied:

$$0.01 \leq f \cdot \lambda \cdot \Sigma(ni/(Mi \cdot Pi^2)) \leq 0.70$$

where λ is a standard wavelength (mm), f is a focal length (mm) of the total system of the objective lens, ni is an order of a diffracted light ray having the maximum diffracted light amount among diffracted light rays generated by the diffractive structure formed on the $i^{th}$ surface, Mi is the number of ring-shaped zones of diffractive structure within an effective diameter of the $i^{th}$ surface and Pi is the minimum value (mm) of the distance between adjoining ring-shaped zones of the diffractive structure within an effective diameter of the $i^{th}$ surface.

12. The objective lens of claim 6, wherein the following formula is satisfied:

$$0.2 \leq |(Ph/Pf)-2| \leq 10.0$$

where Pf is a distance (mm) between adjoining ring-shaped diffractive zones at an image-side numerical aperture necessary for conducting recording and/or reproducing for an optical information recording medium, and Ph is a distance (mm) between adjoining ring-shaped diffractive zones at a numerical aperture half of the image-side numerical aperture necessary for conducting recording and/or reproducing for an optical information recording medium.

13. The objective lens of claim 6, wherein in the case of combining a diffractive action as the diffractive lens and a refractive action as a refractive lens, the objective lens has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

14. The objective lens of claim 6, wherein an amount of a $ni^{th}$ ordered diffracted light ray generated by the diffractive structure formed at the $i^{th}$ surface is largest among any other ordered diffracted light rays and the objective lens converges the $ni^{th}$ ordered diffracted light ray generated by the diffractive structure onto an information recording plane of the optical information recording medium, where n is an integer other than 0 and ±1.

15. The objective lens of claim 6, wherein the following formula is satisfied:

$$0.01 \leq |m| \leq 0.30$$

$$0.8 \leq d/f \leq 2.4$$

$$0.8 < r1/((n-1) \cdot f \cdot \sqrt{(1+|m|)}) < 1.6$$

$$0.25 \leq (X1-X2)(n-1)/NA \cdot f \cdot \sqrt{(1+|m|)} \leq 0.75$$

where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture, d is a thickness (mm) of the objective lens on an optical axis, f is a focal length (mm), r1 is a paraxial radius (mm) of curvature of the light source side surface of the objective lens, n is a refractive index of the objective lens for a used wavelength, X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and where X1 takes a positive sign when it is measured in the direction toward the optical information recording medium from the tangent plane that serves as a reference point, and X1 takes a negative sign when it is measured in the direction toward the light source, and where X2 is a difference (mm) in the direction of the optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and where X2 takes a positive sign when it is measured in the direction toward the optical information recording medium from the tangent plane that serves as a reference point, and X2 takes a negative sign when it is measured in the direction toward the light source.

16. The objective lens of claim 1 or 6, wherein the following formula is satisfied:

$$|SA1/SA2| > 1.0$$

where SA1 is the third order spherical aberration component when an aberration function of the objective lens is developed into Zernike's polynominals, SA2 is the square root of the square sum of the fifth order spherical aberration component, the seventh order spherical aberration component and the ninth order spherical aberration component when the aberration function of the objective lens is developed into Zernike's polynominals.

17. The objective lens of claim 1 or claim 6, wherein the objective lens is made of a optical plastic material.

18. The objective lens of claim 1 or claim 6, wherein the objective lens is made of a optical glass material.

19. The objective lens of claim 1 or claim 6, wherein the objective lens comprises a diaphragm to regulate a light flux between a place which is perpendicular to an optical axis is tangent to the vertex of a light source side surface and a light source side surface.

20. The objective lens of claim 1 or claim 6, wherein on at least one surface, objective lens comprises a section changing discontinuously in a direction normal to a surface at a position corresponding to an image side numerical aperture necessary to conduct recording and/or reproducing information for an optical information recording medium such that the section regulates a diameter of a converged light flux.

21. A converging optical system for use in an optical pickup apparatus for recording and/or reproducing information of an optical information recording medium, comprising:

an objective lens being a single lens and comprising an aspherical surface on at least one surface;

wherein the objective lens is a finite conjugate type to converge a divergent light flux from the light source onto an information recording plane of the optical information recording medium and satisfies the following formula:

$$NA \geq 0.7$$

where NA is an image-side numerical aperture necessary for conducting recording and/or reproducing information of the optical information recording medium, and wherein the following formula is satisfied:

$$0.25 \leq (X1-X2)(n-1)/NA \cdot f \cdot \sqrt{(1+|m|)} \leq 0.75,$$

where f is a focal length, where n is a refractive index of the objective lens for a used wavelength, where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture, where X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and where X1 takes a positive sign when it is measured in the direction toward the optical information recording medium from the tangent plane that serves as a reference point, and X1 takes a negative sign when it is measured in the direction toward the light source, and where X2 is a difference (mm) in the direction of the optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and where X2 takes a positive sign when it is measured in the direction toward the optical information recording medium from the tangent plane that serves as a reference point, and X2 takes a negative sign when it is measured in the direction toward the light source.

22. The converging optical system of claim 21, further comprising a correction means to correct fluctuation of a spherical aberration generated in the converging optical system.

23. The converging optical system of claim 22, wherein the correcting means comprises a displaceable element which is provided between the light source and the objective lens and is displaceable along the optical axis so as to change a degree of divergence of an outgoing light flux.

24. The converging optical system of claim 23, wherein the correcting means is a coupling lens provided on an optical path between the light source an the objective lens and at least one lens group of the coupling lens is the displaceable element.

25. The converging optical system of claim 23, wherein the displaceable element is made of an optical plastic material.

26. The converging optical system of claim 22, wherein the correcting means is an element which is provided between the light source and the objective lens and has a refractive index distribution changeable in a direction perpendicular to the optical axis.

27. The converging optical system of claim 22, wherein the correcting means is an element which is provided between the objective lens and the optical information recoding medium and has a changeable refractive index.

28. The converging optical system of claim 22, wherein the converging optical system conducts recording and/or reproducing information of an information recording medium which has a plurality of information recording layers on the same light flux incident side, and the correcting means corrects a fluctuation of a spherical aberration caused by differences in thickness of transparent substrate from the light flux incident surface to respective information recording layers at the time of focus jump among the plurality of information recording layers.

29. The converging optical system of claim 21, wherein a used wavelength is 600 nm or less and the converging optical system comprises a ring-shaped diffractive structure provided at least one surface of an optical element of the converging optical system.

30. The converging optical system of claim 29, wherein when the light source generates a wavelength fluctuation within ±10 nm, the diffractive structure has a function to suppress a longitudinal chromatic aberration caused by a refractive index dispersion of the converging optical system due to the wavelength fluctuation of the light source.

31. The converging optical system of claim 29, wherein in the case of combining a diffractive action as the diffractive lens and a refractive action as a refractive lens, the converging optical system has a longitudinal chromatic aberration characteristic in which a back focal distance changes so as to become shorter when the wavelength of the light source changes toward a longer wavelength side and the following formula is satisfied:

$$-1 < \Delta CA/\Delta SA < 0$$

where $\Delta CA$ represents an amount of a change (mm) of a longitudinal chromatic aberration for a change of a wavelength, and $\Delta SA$ represents an amount of a change (mm) of a spherical aberration of a marginal ray for a change of a wavelength.

32. The converging optical system of claim 29, wherein an amount of a $n^{th}$ ordered diffracted light ray generated by the diffractive structure is largest among any other ordered diffracted light rays and the converging optical system converges the $n^{th}$ ordered diffracted light ray generated by the diffractive structure onto an information recording plane of the optical information recording medium, where n is an integer other than 0 and ±1.

33. The converging optical system of claim 21, wherein the objective lens comprises a ring-shaped diffractive structure on at least one surface.

34. An optical pickup apparatus for recording and/or reproducing information of an optical information recording medium, comprising:

a light source;

a converging optical system having the converging optical system described in claim 21 comprising the finite conjugate type objective lens to converge a divergent light flux from the light source onto an information recording plane of the optical information recording medium, the objective lens being a single lens;

a detector to detect a fluctuation of a spherical aberration generated in the converging optical system by detecting a reflected light flux from the information recording plane; and a driver to drive a correcting means so as to reduce the fluctuation of the spherical aberration in accordance with a detection result of the detector.

35. A voice and/or image recording and/or voice and/or image reproducing apparatus, comprising:
the optical pickup apparatus described in claim 34.

36. An optical pickup apparatus for recording and/or reproducing information of an optical information recording medium, comprising:
a light source;
a converging optical system comprising a finite conjugate type objective lens to converge a divergent light flux from the light source onto an information recording plane of the optical information recording medium; the objective lens being a single lens and having an aspherical surface on at least one surface;
a detector to detect a fluctuation of a spherical aberration generated in the converging optical system by detecting a light flux reflected from the information recording plane; and
a driver to displace the light source along the direction of the optical axis so as to reduce the fluctuation of the spherical aberration in accordance with a detection result of the detector,
wherein the objective lens satisfies the following formula:

$$NA \geq 0.7$$

where NA is an image-side numerical aperture necessary for conducting recording and/or reproducing information of the optical information recording medium, and
wherein the following formula is satisfied:

$$0.25 \leq (X1-X2)(n-1)/NA \cdot f \cdot \sqrt{(1+|m|)} \leq 0.75,$$

where f is a focal length,
where n is a refractive index of the objective lens for a used wavelength,
where m is a lateral magnification of the objective lens defined with the formula of $NA_{OBJ}/NA_{IMG}$, when $NA_{OBJ}$ is an object-side numerical aperture of the objective lens and $NA_{IMG}$ is an image-side numerical aperture,
where X1 is a difference (mm) in the direction of an optical axis between a plane that is perpendicular to the optical axis and is tangent to the vertex of a light source side surface and a light source side surface at the outermost periphery in the effective diameter (at a position on a light source side surface where the marginal ray at the above NA enters), and where X1 takes a positive sign when it is measured in the direction toward the optical information recording medium from the tangent plane that serves as a reference point, and X1 takes a negative sign when it is measured in the direction toward the light source, and
where X2 is a difference (mm) in the direction of the optical axis between a plane that is perpendicular to the optical axis and is tangent to the vertex of an optical information recording medium side surface and an optical information recording medium side surface at the outermost periphery in the effective diameter (at a position on an optical information recording medium side surface where the marginal ray at the above NA enters), and where X2 takes a positive sign when it is measured in the direction toward the optical information recording medium from the tangent plane that serves as a reference point, and X2 takes a negative sign when it is measured in the direction toward the light source.

37. The converging optical system of claim 36, wherein the finite conjugate type objective lens comprises a ring-shaped diffractive structure on at least one surface.

38. A voice and/or image recording and/or voice and/or image reproducing apparatus, comprising:
the optical pickup apparatus described in claim 36.

39. The optical pickup apparatus of claim 36, wherein the light source is displaceable along the direction of the optical axis so as to change the degree of divergence of the light flux going to be incident to the objective lens.

* * * * *